(12) United States Patent  
Raghunathan et al.

(10) Patent No.: US 7,606,732 B2  
(45) Date of Patent: *Oct. 20, 2009

(54) DISTRIBUTED METER NETWORKS AND SYSTEMS FOR MONITORING SAME

(75) Inventors: Prabhu R. Raghunathan, Pittsburgh, PA (US); Patrick J. Danial, Syracuse, NY (US); Mark E. Young, Syracuse, NY (US)

(73) Assignee: US Beverage Net Inc., Syracuse, NY (US)

( * ) Notice: Subject to any disclaimer, the term of this patent is extended or adjusted under 35 U.S.C. 154(b) by 238 days.

This patent is subject to a terminal disclaimer.

(21) Appl. No.: 11/377,915

(22) Filed: Mar. 16, 2006  
(Under 37 CFR 1.47)

(65) Prior Publication Data

US 2007/0220136 A1 Sep. 20, 2007

(51) Int. Cl.  
*G06Q 50/00* (2006.01)  
*G06F 17/00* (2006.01)  
*G01F 1/00* (2006.01)

(52) U.S. Cl. .......................... 705/15; 700/231; 702/45

(58) Field of Classification Search ................ 705/28, 705/15; 702/45; 700/231  
See application file for complete search history.

(56) References Cited

U.S. PATENT DOCUMENTS

| | | | |
|---|---|---|---|
| 4,628,313 A | | 12/1986 | Gombrich et al. |
| 5,721,383 A | * | 2/1998 | Franklin et al. .......... 73/861.77 |
| 5,731,981 A | * | 3/1998 | Simard ....................... 700/239 |
| 5,920,261 A | | 7/1999 | Hughes et al. |
| 6,298,451 B1 | | 10/2001 | Lin |
| 6,556,142 B2 | | 4/2003 | Dunstan |
| 6,719,175 B2 | * | 4/2004 | Mackenzie et al. .......... 222/399 |
| 6,751,525 B1 | * | 6/2004 | Crisp, III ..................... 700/241 |
| 6,807,532 B1 | | 10/2004 | Kolls |
| 7,360,124 B2 | * | 4/2008 | Bouchard ..................... 714/47 |
| 2001/0044672 A1 | * | 11/2001 | Sudolcan et al. ............ 700/231 |
| 2002/0070861 A1 | | 6/2002 | Teller |
| 2002/0088823 A1 | * | 7/2002 | Tabacchi et al. .............. 222/52 |
| 2003/0074106 A1 | | 4/2003 | Butler |

(Continued)

OTHER PUBLICATIONS

Rick Gould (Sep. 22, 1994). Technology: Bar manager's tonic Rick Gould reports on a software package that helps to keep track of drink sales. The Guardian (pre-1997 Fulltext).*

(Continued)

*Primary Examiner*—Matthew S Gart  
*Assistant Examiner*—Ashford S Hayles  
(74) *Attorney, Agent, or Firm*—K&L Gates LLP

(57) ABSTRACT

A system for monitoring one or more nodes of a distributed meter network. The system includes at least one meter device at each node for metering a product and for generating a signal representative of a corresponding metering rate. A computation device in communication with the at least one meter device is provided at each node for computing meter data based upon the generated signal. The system further includes an autonomous intelligent network interface module (AINIM) at each node and in communication with the computation device. The AINIM includes a first microcontroller for autonomously and continuously monitoring the computation device and collecting meter data therefrom. The AINIM further includes a second microcontroller for receiving the meter data from the first microcontroller and autonomously distributing at least a portion of the received meter data via a communication network for receipt by a remote computer.

10 Claims, 12 Drawing Sheets

U.S. PATENT DOCUMENTS

| | | | |
|---|---|---|---|
| 2003/0191558 A1* | 10/2003 | Arellano | 700/237 |
| 2004/0217124 A1 | 11/2004 | Crisp, III | |
| 2004/0254759 A1 | 12/2004 | Kubach et al. | |
| 2005/0240315 A1 | 10/2005 | Booth et al. | |
| 2006/0047800 A1* | 3/2006 | Caveney et al. | 709/223 |
| 2006/0113322 A1* | 6/2006 | Maser et al. | 222/129.1 |
| 2007/0174437 A1* | 7/2007 | Kraus | 709/223 |
| 2007/0193653 A1 | 8/2007 | Gagliano et al. | |
| 2007/0220126 A1 | 9/2007 | Raghunathan et al. | |
| 2007/0237080 A1* | 10/2007 | Savagaonkar | 370/235 |

OTHER PUBLICATIONS

Auper Electronic Controls Inc., Harpagon Beverage Control System Data Sheet, publication date unknown, available at http://www.auper.com (last visited Oct. 30, 2005).

Auper Electronic Controls Inc., Draft Manager 2002 SCI (Sales Conversion Interface) User Guide, publication date unknown, available at http://www.auper.com (last visited Oct. 30, 2005).

Digiorgio et al., "A promise of easier embedded-systems networking," Java World, Nov. 1999, available at http://www.javaworld.com/javaworld/jw-11-1999/jw-11-tini_p.html (last visited Oct. 25, 2005).

NetBurner, Mod5272 and Mod5282 core modules, product overview and hardware specifications, publication date unknown.

Sena, Nemo10 Embedded Device Server Module, product webpage, publication date unknown, available at http://www.sena.com/products/by_name/nemo10/ (last visited Nov. 9, 2005).

DCB, "Using the Etherpath with PC and Unix Port Redirection," publication date unknown, available at http://www.dcbnet.com/notes/0006etherpathredirect.html (last visited Nov. 4, 2005).

DCB, EtherPath® SS-1 Single Port Serial Server "Ethernet Modem", Data Sheet, publication date unknown, available at http://www.dcbnet.com/datasheet/ss1ds.html (last visited Nov. 4, 2005).

Moxa Technologies, "Chapter 2. Serial-to-Ethernet Applications," The Serial-to-Ethernet Guidebook: Solutions Utilizing Serial Device Server Technology, 3d printing, Feb. 2004.

Lantronix, WiPort Wireless Embedded Device Server, product webpage, publication date unknown, available at http://www.lantronix.com/device-networking/embedded-device-servers/wiport.html (last visited Oct. 30, 2005).

Othman et al., "The Design of an Adaptive Middleware Load Balancing and Monitoring Service," Third International Workshop on Self-Adaptive Software, Arlington, VA, USA, Jun. 9-11, 2003, available at http://www.cs.wustl.edu/~schmidt/PDF/IWSAS_2003.pdf (last visited Dec. 4, 2005).

Auper Electronic Controls Inc., Draft Manager SCI with POS Interface Data Sheet, publication date unknown, available at http://www.auper.com (last visited Oct. 30, 2005).

Gore et al., "The Design and Performance of a Real-time Notification Service," In the Proceedings of the $10^{th}$ IEEE Real-time Technology and Application Symposium, May 2004.

Intelligent Instrumentation, Serial EDAS, product webpage, publication date unknown, available at http://www.instrument.com/italy/serialedas.asp (last visited Nov. 30, 2005).

International Search Report and Written Opinion for International Application No. PCT/US2007/06669 mailed Sep. 9, 2008. (8 pages).

Titan Totalizers, Crossfire Engineering, Inc., available at http://kegman.net/pos/beercontrol.html (last visited May 18, 2009).

Raymaster Pro 100 Liquor System, Bristol Business Machines Ltd., available at http://www.bristolnf.com/liquorcontrol.htm (last accessed May 18, 2009).

GW51C-MAXI-WDT specifications, atop Technologies (2008), available at http://www.atop.com.tw/en/productDetail.php?pd_id=31&pl1_id= (last accessed May 18, 2009).

AirLink™ Junxion Box™ Wireless Cellular Router, Sierra Wireless, available at http://www.sierrawireless.com/product/AirLink/JunxionBox.aspx (last accessed May 18, 2009).

Non-Final Office Action, U.S. Appl. No. 11/377,899, issued by the USPTO on May 15, 2009.

* cited by examiner

| Name | Oz Poured | Oz Sold | Difference | Variance |
|---|---|---|---|---|
| USBN Lite | 297.01 | 270.00 | -27.01 | -10% |
| USBN Pale Ale | 67.34 | 60.00 | -7.34 | -12.23% |
| USBN Seasonal | 0.00 | 0.00 | 0.00 | 0% |
| Total | 364.35 | 330.00 | -34.35 | -10.41% |

From: 03/08/2006 09:01
To: 03/17/2006 15:52

Location Selector: Syracuse Office - Syracuse

DISTRIBUTED METER NETWORKS AND SYSTEMS FOR MONITORING SAME

TECHNICAL FIELD OF THE INVENTION

The present invention concerns flow meter networks and flow meter systems.

BACKGROUND

Beverage dispensation systems are frequently utilized by servers in bars, restaurants, and other point-of-sale (POS) locations to facilitate the pouring of beverages into glasses and other containers for customer purchase and consumption. Such systems are generally capable of dispensing a selection of different beverages (e.g., beers, sodas, etc.), thus enabling fulfillment of a large number and variety of beverage orders in an efficient and timely manner. Servers and/or the business proprietor may manually monitor the volume of beverages dispensed (e.g., by tallying the number of glasses of each beverage sold) for a variety of purposes, including inventory tracking and pour cost analysis. Monitoring beverage dispensation in this manner, however, is difficult to perform in real time and may not provide an acceptably accurate indication of dispensed beverage volumes. For example, such methods cannot detect or otherwise account for problems such as server errors (e.g., overfilling, wastage), pricing discrepancies, unauthorized consumption, and unregistered sales. By some estimates, these problems may cause dispensed beverage volumes to be underreported by 10-25%. Monetary losses due to such problems at a single POS may be substantial and, when compounded across the POS locations of a large business enterprise (e.g., a national restaurant chain), may be on the order of millions of dollars. To address these and other problems, flow meter systems for automatically measuring and totaling beverage volumes as they are dispensed have been developed for use in conjunction with beverage dispensation systems.

FIG. 1 illustrates a schematic diagram of a conventional flow meter system 5 for monitoring beverage dispensation. The system 5 includes a plurality of flow meter devices (FMDs) 10, a signal conditioning device (SCD) 15, and a flow computation device (FCD) 20. Typically, devices 10, 15, 20 are purchased in the form of a prepackaged flow meter subsystem 25, such as the Harpagon flow meter subsystem sold by Auper Electronic Controls Inc., Quebec, Canada. The flow meter system 5 further includes a host computer 30 for use with the flow meter subsystem 25 and is typically purchased separately therefrom.

The FMDs 10 are typically of a turbine design and configured for in-line attachment to the piping of a beverage dispensation system (not shown) such that each beverage flows through a corresponding FMD 10 prior to being dispensed. Each FMD 10 outputs an analog voltage pulse signal responsive to the beverage flow therethrough. For a given FMD 10, the pulse frequency of the output signal is indicative of the beverage flow rate, and the total number of pulses of the output signal, when accumulated, is indicative of the total beverage flow.

The SCD 15 is in communication with the FMDs 10 and receives the respective output signals therefrom. Signal conditioning circuitry (not shown) within the SCD 15 may convert each FMD 10 signal into a corresponding discrete output signal (e.g., a square wave voltage signal) of a frequency equal to that of the FMD 10 signal and having voltage levels suitable for subsequent processing by the FCD 20. Alternatively, the signal conditioning circuitry may convert each FMD 10 signal into a corresponding analog output signal (e.g., a voltage signal) having a DC value proportional to the pulse frequency of the FMD 10 signal. Isolation circuits (not shown) within the SCD 15 may electrically isolate each FMD 10 from the other components of the system 5.

The FCD 20 receives the signals output by the SCD 15. With reference to FIG. 1b, the FCD 20 typically includes a microcontroller 35, a read-only memory (ROM) module 40, a random-access memory (RAM) module 45, an input/output (I/O) and display interface 50, and a communication module 55. The microcontroller 35 is configured to execute a set of firmware instructions stored within the ROM module 40 for computing real-time flow data corresponding to each FMD 10 based on the signals received from the SCD 15. For example, where the signals output by the SCD 15 are discrete signals, the microcontroller 35 may determine a frequency and maintain a pulse count total for each in order to compute a flow rate and a flow total, respectively, for each FMD 10. Where the signals output by the SCD 15 are analog signals, the microcontroller 35 may generate digitized representations of each to compute corresponding flow rates and then integrate the flow rates to compute corresponding flow totals. Flow data may be communicated from the microcontroller 35 to the RAM module 45 for storage and subsequent access. Flow data may also be communicated from the microcontroller 35 and/or the RAM module 45 to the I/O and display interface 50 for localized viewing thereon. The I/O and display interface 50 further enables configuration data required for FCD 20 operation to be entered, stored to the RAM module 45, and selectively recalled and displayed as needed. The communication module 55 is in communication with the microcontroller 35 and configured to enable the transmission of flow data, configuration data, and other information from the microcontroller 35 to the host computer 30 of FIG. 1a via a communication link, typically a serial communication link. The communication module 55 is typically configured to support a proprietary serial communication protocol (e.g., the proprietary communication protocol developed by Auper Electronic Controls Inc.) using, for example, an RS-232 electrical interface (e.g., for a single FCD 20 configuration as shown in FIG. 1a) or an RS-422 electrical interface (e.g., for a multiple FCD 20 configuration as shown in FIG. 1c).

With reference to FIG. 1a, the host computer 30 is typically implemented as a personal computer, including an input device 60, such as a keyboard, and a display 65, such as a computer screen or monitor. The host computer 30 typically executes a software application, such as the Draft Manager software application available from Auper Electronic Controls Inc., for initiating the exchange of flow data with the FCD 20, and for processing the flow data to perform account and inventory reconciliation. Additionally, the software package enables the host computer 30 to initiate the exchange of other information, such as the configuration data, with the microcontroller 35 and/or the RAM module 45.

With reference to FIG. 1c, a plurality of flow meter subsystems 25 may be interconnected to define a primary flow meter network 70 for enabling the monitoring of multiple beverage dispensation systems operating at a common location (e.g., the beverage dispensation systems of refreshment stands within a sports stadium). A communication hub 75 coupled between the FCD 20 of each flow meter subsystem 25 and a host computer 30 routes exchanged information therebetween. As shown, the communication hub 75 and communication modules 55 are configured to communicate using a serial protocol and the RS-422 electrical interface. An RS-422/RS-232 converter (not shown) may be connected between the communication hub 75 and the host computer 30 for enabling electrical interface compatibility. A user of the host computer 30 may thus perform account and inventory reconciliation for each beverage dispensation system of the primary flow meter network 70.

With reference to FIG. 1d, a plurality of the primary flow meter networks 70 may be interconnected via a local area network (LAN) 80 to define a secondary flow meter network 85. The administrative host computer 90 may be in communication with the host computers 30 via a wide area network (WAN) 95 and/or the Internet. In addition to implementing software such as the Draft Manager software application, each host computer 30 may be configured as a server. Accordingly, the administrative host computer 90 may support a remote access utility for enabling its user to log on to each host computer 30 and remotely initiate an instance of the Draft Manager software application for each.

Although the above-discussed flow meter networks address some of the problems associated with monitoring beverage dispensation to an extent, they are generally not well-suited for enabling integrated management and monitoring of multiple beverage dispensation systems spread across one or more geographically diverse business enterprises (e.g., the beverage dispensation systems of multiple restaurant chains) in an efficient and cost-effective manner.

First, the flow meter networks are generally unable to provide a cumulative, real-time indication of flows and flow totals for multiple dispensation systems. With reference to FIG. 1d, for example, the host computers 30 are not configured to communicate received flow data to the administrative host computer 90 as it becomes available. Rather, a user of the administrative host computer 90 must typically log on to each host computer 30 individually, open a corresponding instance of the software application (e.g., the Draft Manager application), and view/control the application remotely. Accordingly, if the user wishes to access the applications of several different host computers 30 simultaneously, a dedicated instance of the software application must be opened on each host computer 30. The administrative host computer 90 thus merely functions as a terminal for viewing/controlling remotely-implemented applications on an individual basis and cannot integrate and/or process flow data from the various flow meter networks 70 to provide a cumulative, real-time indication of beverage dispensation.

Second, because each flow meter network typically operates as a stand-alone network that is more often than not associated with a single business enterprise (e.g., a restaurant chain), the level of integration is low. Additionally, the flow meter networks are not generally accessible to or operable with other external networks. Accordingly, business enterprises not directly affiliated with the various POS locations but nonetheless having a need to monitor the beverages dispensed at each (e.g., beverage manufacturers and distributors) cannot communicate with the flow meter networks in order to receive real-time flow data therefrom.

Third, software applications for use with the flow meter networks, such as the Draft Manager application, typically support only offline account reconciliation functionality, i.e., performing a non-real-time comparison between the amount of beverages dispensed and the amount of beverages sold. More advanced functionalities that might otherwise be desirable and/or necessary for managing and monitoring beverage dispensation on a network-wide basis, such as, for example, automated inventory control and real-time beverage consumption and sales monitoring, are not supported.

Fourth, each flow meter system within the flow meter networks is largely self-contained and requires the installation, configuration, and maintenance of at least one host computer 30 at each location. This in turn necessitates the training, coordination, and active involvement of personnel at each location, increasing installation and operation costs. Furthermore, in cases where the host computer 30 communicates with FCDs 20 utilizing the RS-232 protocol, the distance limitation imposed by the RS-232 communication standard frequently requires the host computer 30 to be placed in the same location as the FCD 20s (e.g., in a basement, storage room, etc.). Such locations generally do not provide a desirable or otherwise convenient setting for using the host computer 30 to perform account and inventory reconciliation tasks. Furthermore, the host computer 30, although capable of performing other computing tasks, is thus typically dedicated to a single use due to its inconvenient location. This further increases installation and operation costs.

Accordingly, there exists a need for a distributed flow meter network that enables integrated management and monitoring of multiple beverage dispensation systems spread across one or more geographically-diverse business enterprises in an efficient and cost-effective manner.

DESCRIPTION OF THE FIGURES

FIG. 7b illustrates a real time reconciliation report according to various embodiments.

SUMMARY

In one general respect, the present invention is directed to a system for monitoring one or more nodes of a distributed meter network. The system includes, at each node, at least one meter device and a computation device in communication with the at least one meter device. Each meter device is configured for metering a product and for generating a signal representative of a corresponding metering rate, and the corresponding computation device is configured for computing meter data based upon the generated signal. In one embodiment, the system further includes a network interface module at each node in communication with the computation device. The network interface module includes an embedded communication circuit for communicating the meter data from the computation device to a remote computer via a communication network responsive to a request transmitted to the network interface module by the remote computer. According to various embodiments, the network interface module may include a serial device server.

In another embodiment, the system further includes an intelligent network interface module at each node in communication with the computation device. The intelligent network interface module includes an embedded microcontroller storing customized firmware that, when executed, causes microcontroller to collect meter data from the computation device, buffer the collected meter data, and communicate at least a portion of the buffered data to a remote computer via a communication network responsive to a request transmitted to the intelligent network interface module by the remote computer.

In yet another embodiment, the system further includes an autonomous intelligent network interface module at each node in communication with the computation device. The autonomous intelligent network interface module includes a first microcontroller and a second microcontroller. The first microcontroller stores customized firmware that, when executed, causes the first microcontroller to autonomously and continuously monitor the computation device and collect meter data therefrom. The second microcontroller stores customized firmware that, when executed, causes the second microcontroller to receive the meter data from the first microcontroller and autonomously distribute at least a portion of the received meter data via a communication network for receipt by a remote computer.

According to various embodiments, at least one node of the distributed meter network is associated with a point-of-sale location, and the metered product is a beverage product dispensed at the point-of-sale location.

DESCRIPTION OF THE INVENTION

Figure 2A:
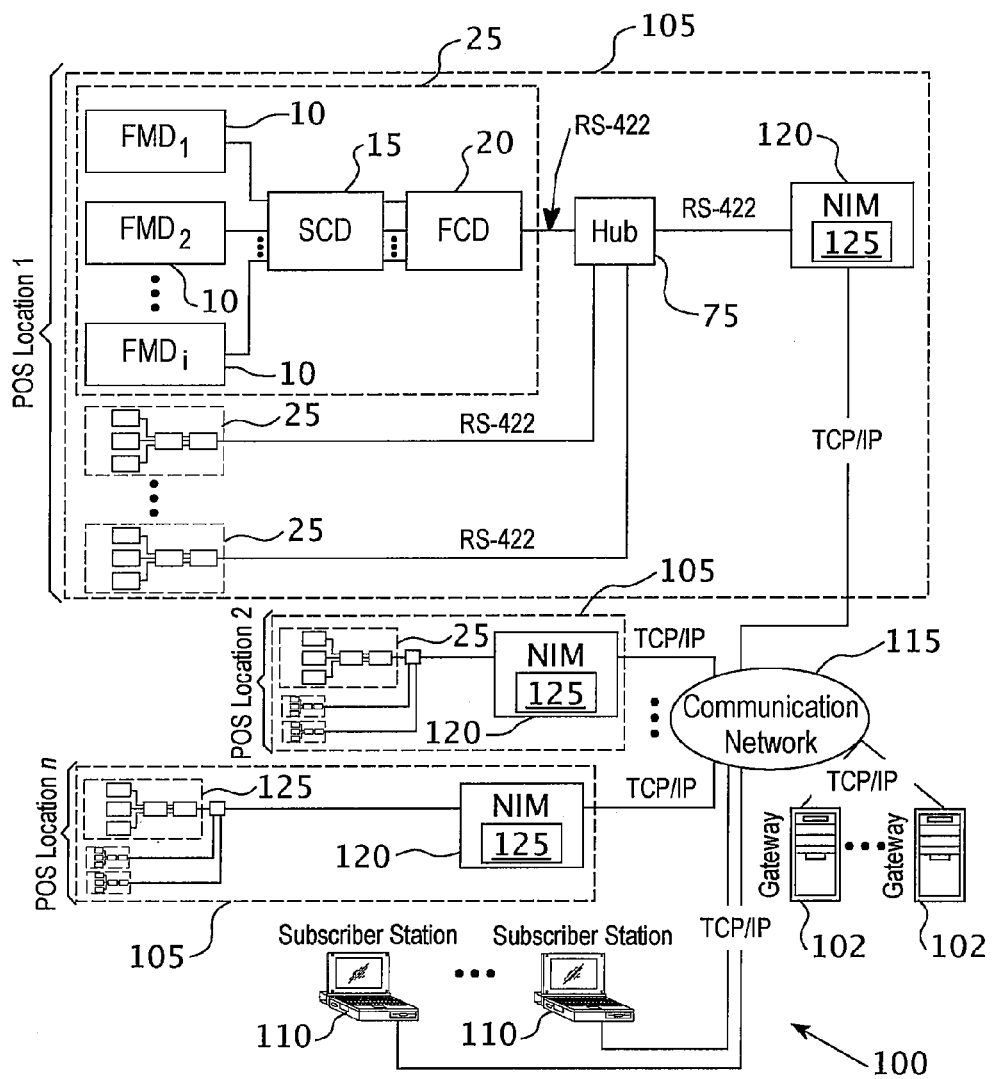
FIG. 2a illustrates a distributed flow meter network according to various embodiments of the present invention.

FIG. 2a illustrates a distributed flow meter network (DFMN) 100 for monitoring and analyzing beverage dispensation at one or more POS locations according to various embodiments of the present invention. As used herein, "POS location" refers generally to the location of any business or other facility (e.g., a restaurant, a stadium) at which dispensed beverages are sold or otherwise provided for consumption. Although the embodiments of FIG. 2a are discussed within the particular context of beverage flow monitoring and analysis (as are the other embodiments presented herein), it will be appreciated that these embodiments are provided by way of example only and are not intended to limit the application or scope of the present invention. It will be appreciated, for example, that embodiments of the present invention may be used to monitor and analyze the dispensation or consumption of any meterable material or product (e.g., water, natural gas, electricity, etc.) at one or more POS and/or non-POS locations (e.g., "nodes"). It will further be appreciated that embodiments of the present invention may additionally or alternatively be used to monitor and analyze any physically measurable parameters (e.g., temperature, pressure, pH, toxicity, voltage, current, etc.) associated with a material or product (whether meterable or not) at one or more POS and/or non-POS locations.

As shown, the DFMN 100 may comprise one or more gateway servers 102 in communication with one or more local flow meter networks (LFMNs) 105 and one or more subscriber stations 110 via a communication network 115. The LFMNs 105 may be installed at the respective POS locations of a common business enterprise (e.g., the POS locations of a restaurant chain) or at the respective POS locations of different business enterprises (e.g., the POS locations of a restaurant chain and a deli chain). According to various embodiments, the subscriber stations 110 may be installed at a common location, or at different locations, remote from each of the POS locations. Such locations may include, for example, an administrative office of a restaurant chain, a beverage distributor, a beverage supplier, or any other location remote from the POS locations at which monitoring and analysis of beverage dispensation is desired. According to other embodiments, one or more of the subscriber stations 110 may be installed at one or more of the POS locations. The gateway servers 102 may be installed at a common location or at different locations remote with respect to the POS and subscriber station 110 locations. For example, the gateway servers 102 may be installed at the offices of a business enterprise that provides beverage dispensation monitoring and analysis services for a fee. According to other embodiments, one or more of the gateway servers 102 may be installed at one or more of the POS and/or subscriber station 110 locations.

Figure 1A:
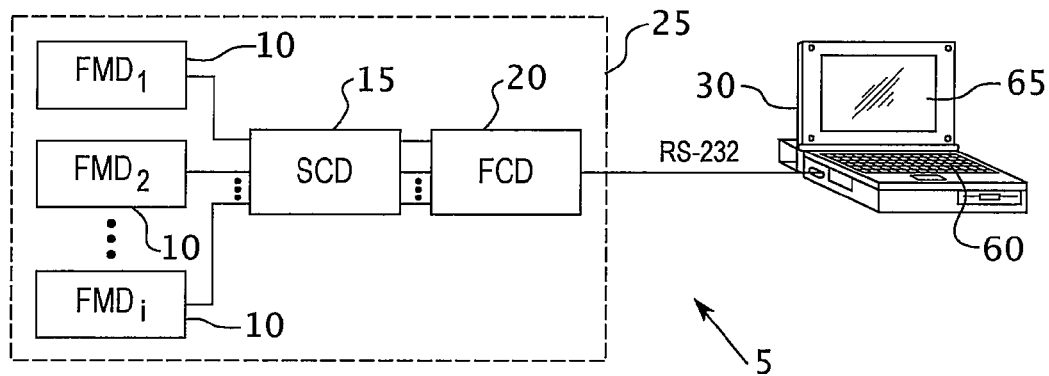
FIG. 1a is a schematic diagram of a conventional flow meter system.
Figure 1B:
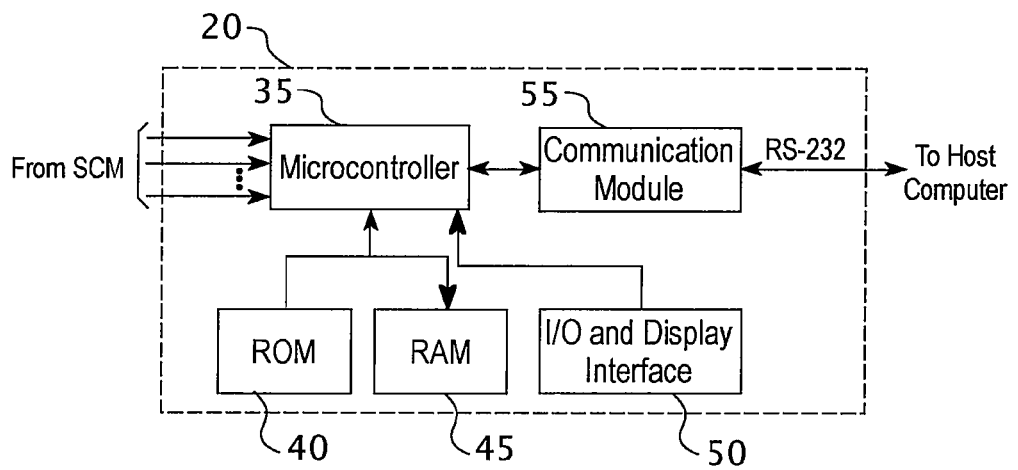
FIG. 1b is a schematic diagram of a conventional flow computation device.
Figure 1C:
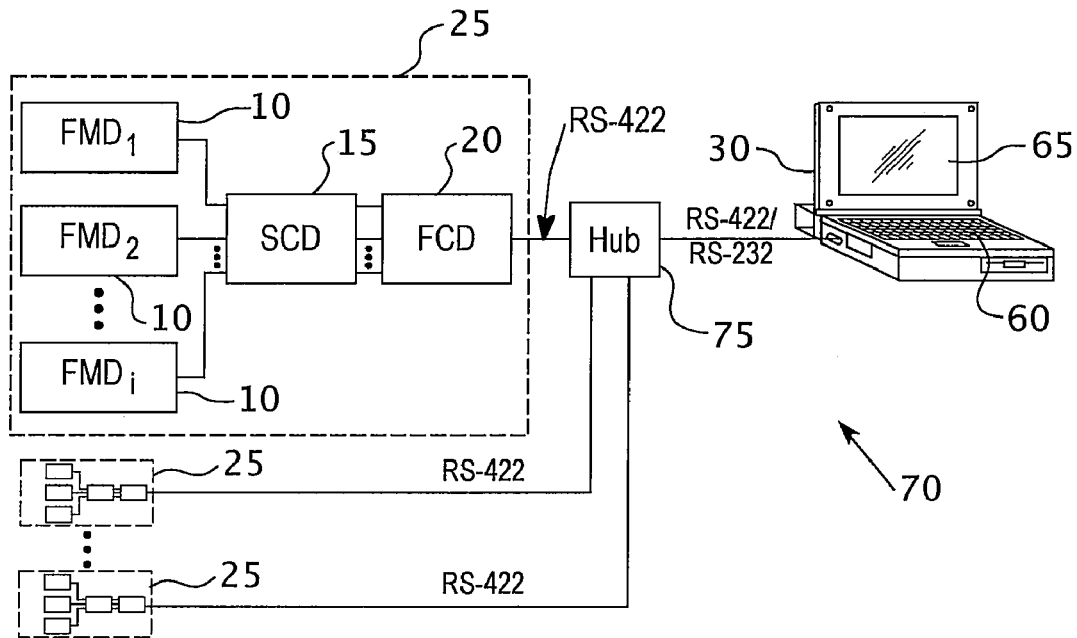
FIG. 1c is a schematic diagram of a conventional flow meter network.

According to various embodiments, each LFMN 105 may comprise one or more flow meter subsystems 25, such as, for example, the Harpagon flow meter subsystems sold by Auper Electronic Controls Inc. It will be appreciated that the flow meter subsystems 25 need not be of a commercially-available and prepackaged design, and may instead be custom-built using off-the-shelf components that, when assembled, perform the function of monitoring dispensed beverage amounts. Each flow meter subsystem 25 may be used in conjunction with one or more beverage dispensation systems (not shown) at the corresponding POS location and provide flow data in a manner similar or identical to that discussed above with respect to FIG. 1a. It will be appreciated that each flow meter subsystem 25 may generally be configured to provide flow data for any beverage suitable for use with any conventional beverage dispensation system. Such beverages may comprise, for example, alcoholic beverages (e.g., beer, liquor) and nonalcoholic beverages (e.g., soda, water). Conventional beverage dispensation systems may include, for example, pressurized dispensation systems (e.g., beer, soda dispensations systems).

Figure 2B:
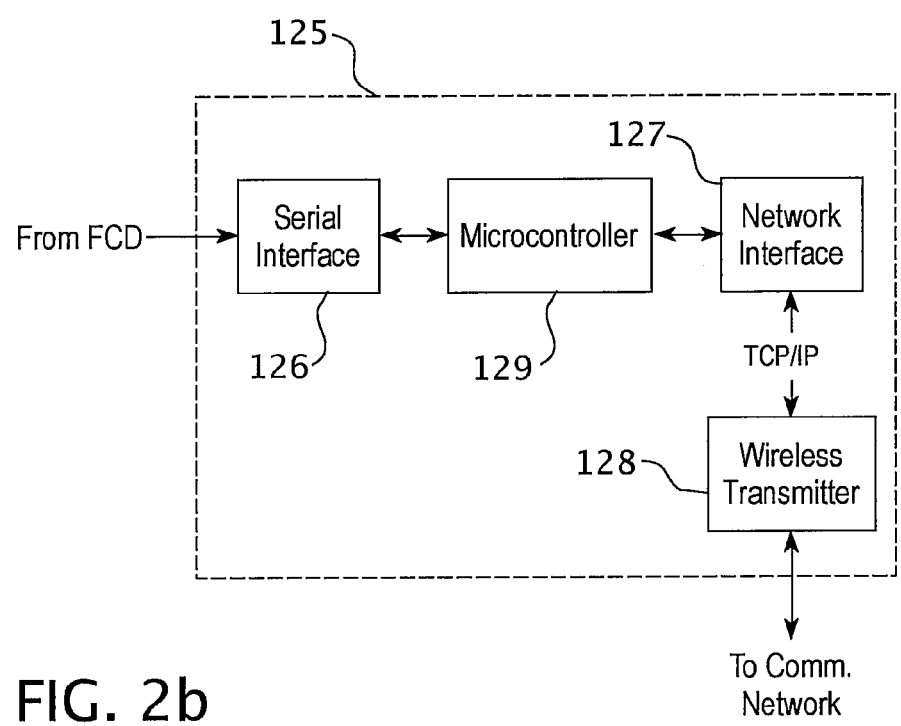
FIG. 2b is a schematic diagram of a network interface module according to various embodiments of the present invention.
Figure 2C:
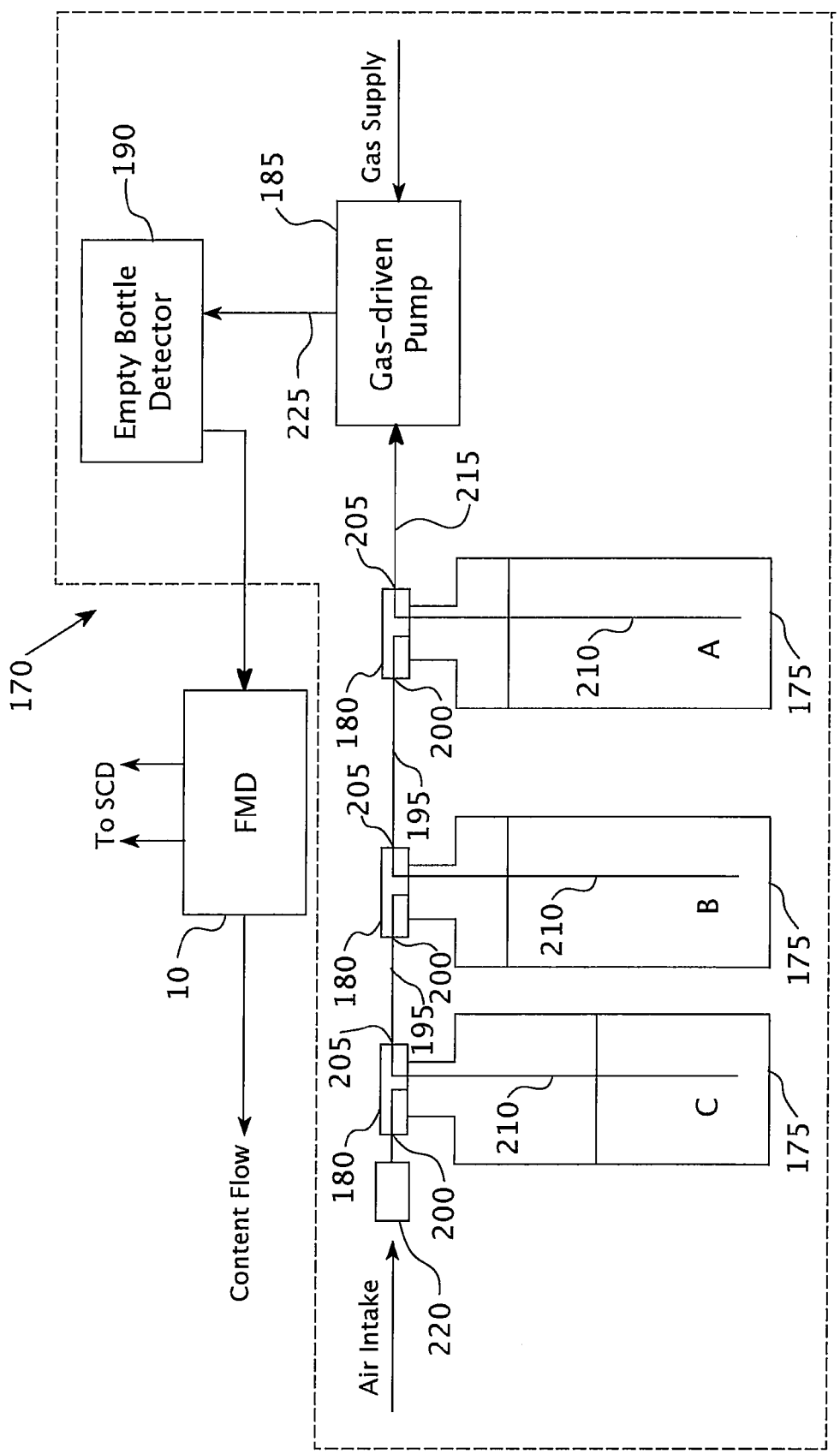
FIG. 2c is a block diagram of a non-pressurized dispensation system according to various embodiments.

FIG. 2c illustrates a non-pressurized beverage dispensation system 170 that may be used with embodiments of the present invention for dispensing bottled beverages, such as, for example, liquors and wines. As shown, the system 170 may comprise one or more containers 175, a dual-port cap assembly 180 for each container 175, a pump 185, and an empty container detector 190. According to various embodiments, each container 175 may be any bottle-type container, such as, for example, a conventional glass or plastic liquor/wine container, having an open neck portion suitable for sealably receiving an oppositely-gendered portion of the corresponding cap assembly 180. The containers 175 may be connected in series by process lines 195 and by inlet and outlet ports 200, 205 formed in each cap assembly 180. As shown, each inlet port 200 may define a passageway connecting the exterior of the cap assembly 180 to the interior neck portion of the container 175 when the cap assembly 180 is installed. The outlet port 205 may define a similar passageway when the cap assembly 180 is installed. A draw tube 210 is connected to the outlet port 205 within the container 175 and extends in a downward fashion toward the container 175 bottom. The outlet port 205 of the first container 175 in the series (denoted by A) may be connected to the pump 185 inlet via a process line 215. An air intake 220 may be connected to the inlet port 200 of the last container 175 in the series (denoted by C).

During operation, the pump 185 draws the contents from the containers 175 for output through an FMD 10 via the empty container detector 190. Although the pump 185 is depicted as a gas-driven pump, it will be appreciated that other types of pumps may be used instead. By virtue of the series connection, the last container 175(C) will be emptied first, followed by any intermediate container(s) (denoted by B). The first container 175(A) will be the last to empty. During pump 185 operation, the air intake 220 enables air to enter the containers 175 to replace their depleted contents. A wire mesh (e.g. 50 gauge wire mesh) (not shown) may be provided for preventing airborne particles from entering through the air intake 220. As an alternative to the air intake 220, a nitrogen gas feed may be provided to preserve the quality of dispensed beverages. During pumping, the empty bottle detector 190 functions as a membrane tank and absorbs any diaphragm action introduced by the pump 185 via process line 225 such that a steady flow rate is provided. When the containers 175 are empty, the empty bottle detector 190 fills with air, thus keeping the system primed. The empty bottle detector 190 may be implemented using, for example, a conventional foam control detector (FOB) typically used in draft beer dispensation systems.

With reference to FIG. 2a, each LFMN 105 may further comprise a multi-port hub 75, such as, for example, an RS-422 hub, for communicatively interconnecting the flow meter subsystems 25, although it will be appreciated that the hub 75 may not be necessary for LFMNs 105 comprising only one flow meter subsystem 25.

As discussed above, embodiments of the present invention may be used for monitoring and analyzing any meterable material or product, as well as for monitoring and analyzing any physically measurable parameter of any meterable or non-meterable material or product. According to such embodiments, the flow meter subsystem 25 may, in addition or as an alternative to the FMDs 10, include other metering devices and/or sensors in communication with the SCD 15. Such metering devices may include, without limitation, metering devices for gases and solids (e.g., gas flow meters, water flow meters, weigh belts, etc.), and metering devices for electrical energy (e.g., watt meters). Suitable sensors may include any sensor for converting a physical parameter into a representative electrical signal (e.g., thermocouples, load cells, pressure transducers, electrochemical sensors, position sensors, etc.). The SCD 15 may be suitably configured to condition electrical signals from the metering devices and/or sensors into a form suitable for processing by the corresponding FCD 20.

Each LFMN 105 may further comprise a network-enabled interface module (NIM) 120 in communication with the FCDs 20 of the corresponding flow meter subsystems 25 via the hub 75. In embodiments in which a hub 75 is not present within a LFMN 105 (e.g., where the LFMN 105 comprises only one flow meter subsystem 25), the corresponding NIM 120 may communicate directly with the FCD 20. Each NIM 120 may further be in communication with one or more of the gateway servers 102 via the communication network 115. According to various embodiments, the communication network 115 may generally comprise any physical or wireless packet-based network implementing standards-based or proprietary communication protocols. Preferably, the communication network 115 is an IP-based network and comprises the Internet.

According to various embodiments and as shown in FIG. 2a, each NIM 120 may comprise an embedded communication circuit 125 for enabling a bidirectional exchange of data between the corresponding FCDs 20 and one or more of the gateway servers 102 via the communication network 115. Exchanged data may comprise flow-related data, such as, for example, beverage flow rates and flow totals computed by each FCD 20. Exchanged data may further comprise preassigned identification data (e.g., numerical data) that uniquely identifies the particular FCD 20 and FCD 20 input associated with each item of flow-related data. For example, where the DFMN 100 comprises fifty FCDs 20, with each FCD 20 having sixteen inputs, an identification data value of "02506" may indicate that a corresponding item of flow data is associated with sixth input of the twenty-fifth FCD 20. Exchanged data may further comprise non-flow data such as, for example, command data (e.g., flow total reset command data transmit), flow calibration data (e.g., unit/volume calibration data), and communication-related data, such as, for example, polling request data.

According to various embodiments and with reference to FIG. 2b, the embedded communication circuit 125 of each NIM 120 may comprise a serial interface 126 for enabling communication of exchanged data with the corresponding FCDs 20 using, for example, a proprietary serial protocol specific to the FCDs 20. The particular type of serial interface 126 used may be dictated by the configuration of the communication modules 55 of the corresponding FCDs 20. For example, in embodiments in which the communication modules 55 are configured to communicate using the RS-422 electrical interface, as shown in FIG. 2a, the serial interface 126 may be an RS-422 serial interface. It will be appreciated that other types of serial interfaces, such as, for example, RS-232, RS-485, and Universal Serial Bus (USB) serial interfaces, may instead be used if necessary or otherwise desired. It will further be appreciated that any other suitable non-serial communication interface may also be used.

The embedded communication circuit 125 may further comprise a network interface 127 for enabling communication of the exchanged data utilizing network-based communication protocols supported by the communication network 115. For embodiments in which the communication network 115 comprises the Internet or other IP-based network, the network interface 127 may be an Ethernet-based network interface having a static IP address assigned thereto and configured for communicating exchanged data via a physical connection based upon, for example, the IEEE 802.3 specification. Such embodiments may optionally comprise a wireless transmitter 128 disposed between the network interface 127 and the communication network 115 for enabling wireless communication of exchanged data based upon, for example, the IEEE 802.11 specification.

The embedded communication circuit 125 may further comprise an embedded microcontroller 129 for applying a protocol conversion to the exchanged data. According to various embodiments, for example, the microcontroller 129 may execute a set of firmware instructions stored in a memory device (not shown) of the circuit 125 for converting serial data received from the serial interface 126 into a format suitable for transmission via the communication network 115, such as, for example, a TCP/IP format. Similarly, the firmware may enable conversion of data received from the communication network 115 into a serial format suitable for transmission to a FCD 20 via the serial interface 126. It will be appreciated that the embedded microcontroller 129 may also implement a cryptographic protocol (e.g., SSL, TSL, etc.) for ensuring the security of data transmitted via the communication network 115.

In embodiments in which each FCD 20 is a component of a pre-packaged flow meter subsystem 25 (e.g., the Harpagon flow meter subsystem), each NIM 120 may be implemented using a pre-configured commercially-available device designed for external operation, such as, for example, a GW-23 Maxi serial server available from Atop Technologies, Inc. It will be appreciated that other pre-configured commercially-available devices, such as, for example, serial port redirector devices, may alternatively be used in such embodiments to implement the NIMs 120. According to other embodiments, the NIMs 120 may be implemented as board-based versions of such devices and internally incorporated within each FCD 20 to form an integral device that may connect directly to the communication network 115.

Figure 3:
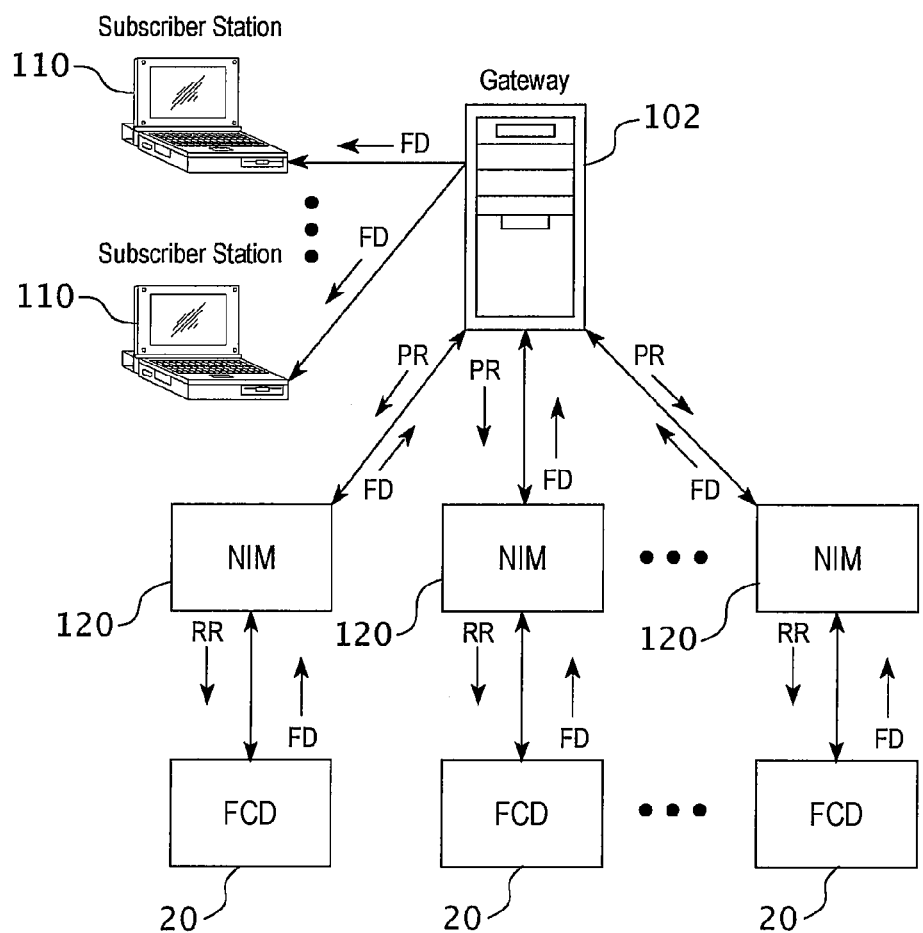
FIG. 3 is a schematic diagram of polling schemes according to various embodiments of the present invention.

According to various embodiments and as shown in FIG. 3, each gateway server 102 may implement software for, among other things, initiating communication of the exchanged data using a polling scheme. For example, communication of flow data (denoted in FIG. 3 as "FD") or other data from one or more of the FCDs 20 to a gateway server 102 may be initiated by means of polling requests (denoted in FIG. 3 as "PR") transmitted from the gateway server 102 to the corresponding NIMs 120 via the communication network 115. Although only one gateway server 102 is shown in FIG. 3 for the sake of clarity, it will be appreciated that multiple gateway servers 102 may be used for transmitting polling requests. The static IP addresses of the polled NIMs 120 are known a priori and stored by the gateway server 102 software. Each polling request may indicate that data is to be read from a particular FCD 20 and specify one or more microcontroller 35 registers and/or RAM module 45 memory locations in which the data is stored. Each polled NIM 120 may apply a protocol conversion to a received polling request and transmit a resulting serial read request (denoted in FIG. 3 as "RR") to the appropriate FCD 20. The FCD 20 may process the read request and respond by transmitting the specified data, if available, to the NIM 120 in a serial format. The NIM 120 may then convert received data into a format suitable for transmission to the gateway server 102 via the communication network 115. Although only one FCD 20 is shown in communication with each NIM 120 for the sake of clarity, it will be appreciated that each NIM 120 may have multiple FCDs 20 in communication therewith, as shown in FIG. 2a. As discussed in further detail below, data collected by the gateway servers 102 from the FCDs 20 may be distributed to the subscriber stations 110 via the communication network 115 using a data distribution scheme implemented by the gateway server 102 software.

According to various embodiments, the gateway server 102 may transmit polling requests to the NIMs 120 in a sequential fashion and at a predetermined frequency such that data from each FCD 20 is retrieved in a periodic fashion. Although the polling frequency is generally selectable to an extent based upon the need for current flow data values, the maximum polling frequency is typically limited by the number NIMs 120 to be polled.

According to other embodiments, the gateway server 102 software may be configured to adaptably change the polling frequency of the NIMs 120 based upon, among other things, a rate of change detected in the corresponding flow data. For example, if a rapid change in the values of flow data associated with a particular FCD 20 is detected (e.g., using a comparison to a pre-determined rate of change threshold), the gateway server 102 may automatically increase the polling frequency of the corresponding NIM 120 relative to the polling frequency of the other NIMs 120. Conversely, the gateway server 102 may automatically decrease the polling frequency of a NIM 120 when values of flow data from the corresponding FCDs 20 indicate little or no change.

Advantageously, incorporation of a NIM 120 into each LFMN 105, or alternatively, into each FCD 20, integrates network-enabled functionality into the flow meter sub-systems 25 while eliminating the need for maintaining comparatively expensive host computers 30 executing specialized software at the POS locations. Monitoring and analyzing beverage flow values across the DFMN 100 is thus enabled from any location at which the communication network 115 is accessible and does not necessitate the presence or active involvement of personnel at each POS location.

Because the maximum frequency at which each gateway server 102 may poll a collection of NIMs 120 within the DFMN 100 generally decreases as the number of NIMs 120 within the collection is increased, use of polling schemes as described above may limit scalability of the DFMN 100 to an extent. Improved scalability of the DFMN 100, as well as other benefits, may be realized by integrating intelligent functionality into each of the LFMNs 105. Preferably, such intelligent functionality is implemented in the form of one or more decision-making processes performed in an autonomous or semiautonomous manner within the LFMNs 105. As used herein, the term "autonomous" generally refers to a process capable of being performed in a self-contained manner without the need for external input or control. The term "autonomous" may also describe a device or a collection of devices configured to perform such processes. The term "semiautonomous" generally refers to those processes or devices that, while autonomous in certain respects, require at least some modicum of external guidance or control. Decision-making processes performed within the LFMNs 105 may control, among other things, the manner in which FCD 20 data is collected and communicated to the gateway servers 102 and the response of the LFMNs 105 to one or more fault conditions. In this way, intelligent functionality may be distributed throughout the DFMN 100 network instead of being localized within the gateway servers 102.

Figure 4:
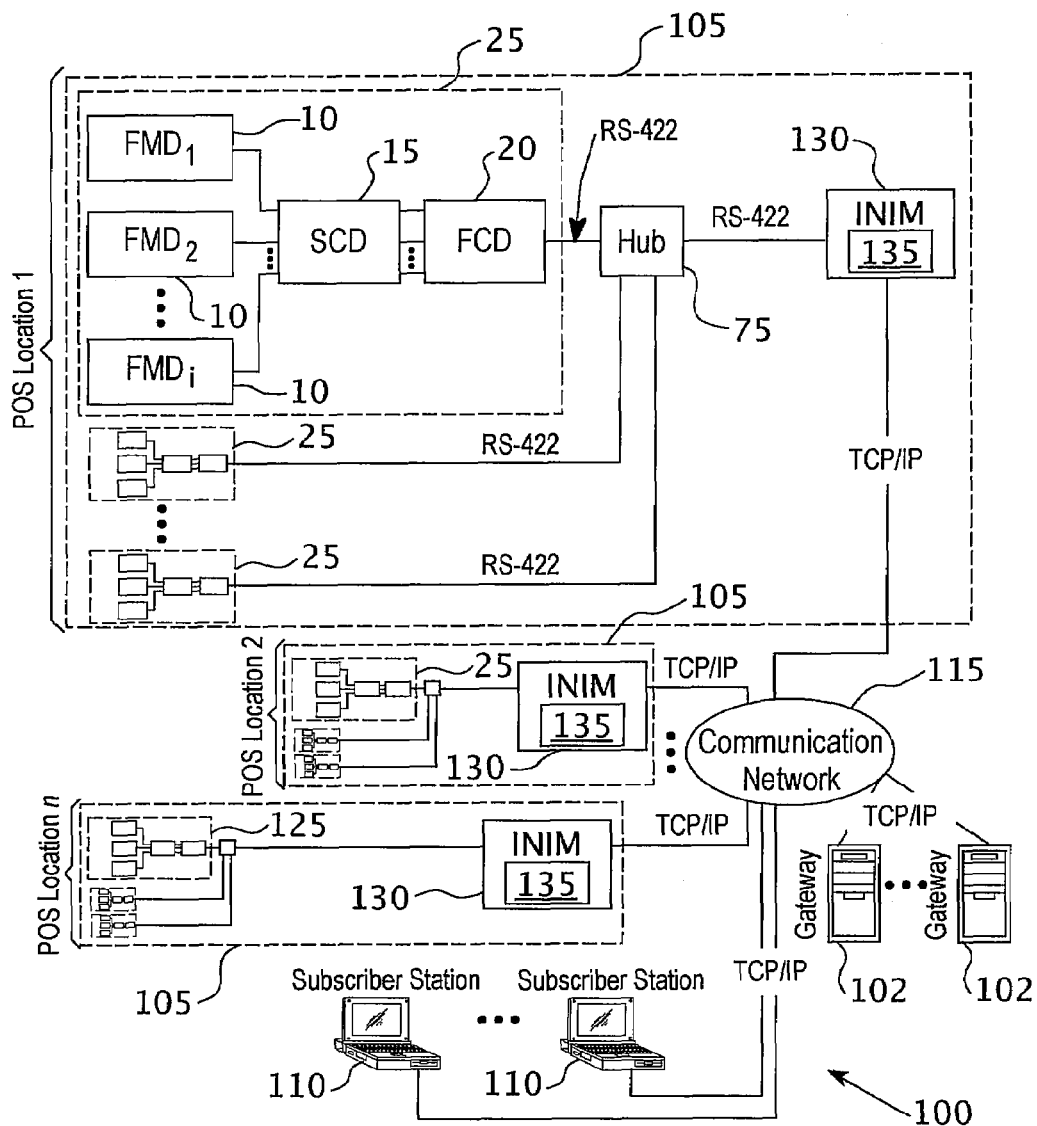
FIG. 4 illustrates a distributed flow meter network according to various embodiments of the present invention.

FIG. 4 illustrates embodiments of the DFMN 100 in which intelligent functionality is integrated into the LFMNs 105. The DFMN 100 is similar to that of FIG. 2a, with the exception that each LFMN 105 comprises an intelligent network interface module (INIM) 130 for communicatively interfacing the corresponding FCDs 20 with one or more of the gateway servers 102. Each INIM 130 may comprise an embedded communication circuit 135 having components similar to those of the NIM 120, such as, for example, a serial interface, a network interface, a wireless transmitter, and an embedded microcontroller. The network interface of each INIM 130, like that of the NIMs 120, may have a corresponding static IP address associated therewith. In other embodiments, the network interface and the embedded microcontroller may be configured to automatically receive a dynamic IP address from a dynamic host configuration protocol (DHCP) server (not shown) upon connection of the INIM 130 to the communication network 115. For such embodiments, the embedded microcontroller may store static IP addresses of one or more of the gateway servers 102 so that the INIM 130 is able to automatically register its dynamic IP address with the gateway servers 102. Preferably, each INIM 130 is implemented using a commercially-available network enablement device, such as, for example, the Netburner Mod5282 processor module available from Netburner, Inc. of San Diego, Calif., that is capable of executing a customized firmware program. As an alternative to providing a single INIM 130 within each LFMN 105 as shown in the embodiments of FIG. 4, it will be appreciated that each FCD 20 may be adapted to accommodate a board-based INIM 130, thus forming an integral device that may connect directly to the communication network 115. In addition to the advantages discussed below, the cost of the INIM 130 is substantially less than that of the host computer 30 of FIG. 2d which it replaces.

Figure 5:
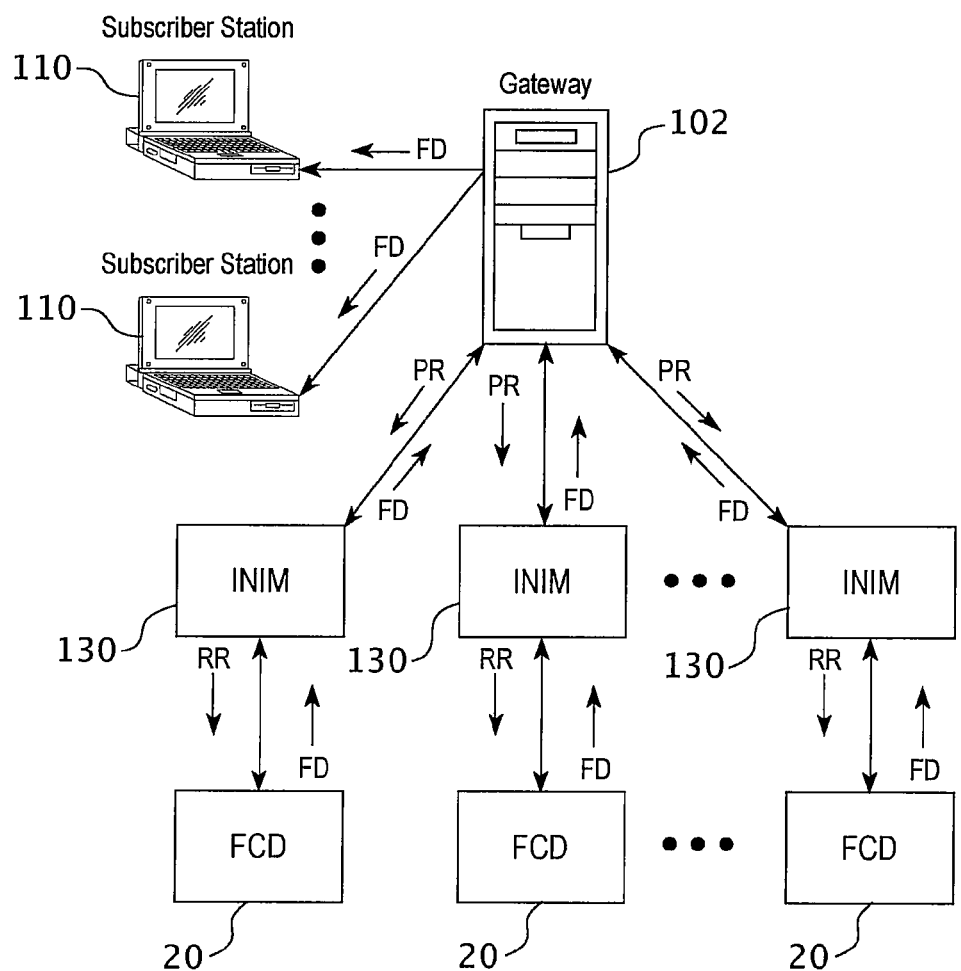
FIG. 5 is a schematic diagram of a polling scheme according to various embodiments of the present invention.

According to various embodiments and as shown in FIG. 5, the INIMs 130 may be configured to respond to polling requests from the gateway servers 102 in a manner similar to that described above in connection with FIG. 3. For example, polling requests may be transmitted from one or more of the gateway servers 102 to the INIMs 130 and converted into read requests which are then routed to the FCDs 20. The requested data is subsequently transmitted in a serial format from the FCDs 20 to the INIMs 130 and converted into a format suitable for transmission to the gateway server 102 via the communication network 115. The gateway servers 102 may be configured to poll the INIMs 130 in a sequential fashion and/or using adaptive polling techniques, as described above.

In addition to requesting data from the FCDs 20 in response to polling requests, the INIMs 130 may further be configured to independently enable the transmission of read requests to their respective FCDs 20 and to buffer the received data. The independent collection of data in this manner may be performed, for example, between consecutive polling requests so that data that might otherwise be updated or overwritten prior to the next polling cycle is retained. Thus, an INIM 130, in response to a polling request, may transmit both current data read from the FCDs 20 in accordance with the polling request, along with at least a portion of the data buffered since the previous polling request. Alternatively or additionally, the INIM 130 may be configured to provide only buffered data in response to a polling request. For example, the INIM 130 may only provide buffered data when current FCD 20 data contains an error or otherwise cannot be read from one or more of the FCDs 20 due to a fault or other condition.

According to various embodiments, in order to increase its buffering capacity, the INIM 130 may be configured to compress buffered data utilizing any suitable data compression algorithm. In one embodiment, for example, the buffered data may be compressed by approximately 30% without loss and stored sequentially within a storage buffer (not shown). If the buffer becomes full, the INIM 130 may be configured such that every other current reading within the buffer is overwritten with a new reading. Thus, the storage size of the buffer is effectively doubled by doubling the interval between consecutive FCD 20 data readings. The buffer size may be continually increased in this fashion such that buffer is capable of continually receiving data as needed. It will be appreciated that readings stored within the buffer may be overwritten utilizing different patterns (e.g., overwriting every third current reading) in other embodiments.

According to various embodiments, one or more of the INIMs 130 may be configured such that independent data collection, as described above, is continuously enabled and performed autonomously. According to other embodiments, the INIMs 130 may be configured to enable independent data collection responsive to one or more pre-determined conditions. For example, an INIM 130 may be configured to autonomously enable independent data collection when a polling request from one or more of the gateway servers 102 has not been received for a predetermined period of time (indicating a gateway server 102 fault) or when communication with one or more of the gateway servers 102 cannot be established (indicating a communication network 115 fault). When polling is subsequently resumed and the communication network 115 is operational, the buffered data may be retrieved by the gateway servers 102. Advantageously, enablement of independent data collection in this manner provides a degree of fault tolerance to the operation of the INIM 130 operation. Alternatively or additionally, independent data collection may be autonomously enabled by the INIMs 130 if the occurrence of a predetermined change in FCD 20 data values is detected thereby. For example, if a flow total for a particular dispensed beverage changes by some predetermined amount (e.g., 100 liters) from one polling request to the next (or over several polling requests), it may be desirable to obtain intermediate flow data for the beverage existing between polling requests. Accordingly, where such a change is detected, the INIMs 130 may autonomously enable independent data collection and provide the buffered data in response to a subsequent polling request.

In addition or as an alternative to the autonomous enablement of independent data collection by the INIMs 130, the INIMs 130 may be configured to enable independent data collection responsive to instructions received from a gateway server 102. The gateway server 102 may be configured to provide such instructions, for example, when it is unable to transmit polling requests to the INIMs 130 at the desired frequency. Furthermore, the INIMs 130 may be configured to provide an indication to one or more of the gateway servers 102 when independent data collection is enabled or disabled. The gateway servers 102 may respond, for example, by adapting the respective polling frequencies of the INIMs 130 providing such indications.

When independent data collection is enabled by the INIMs 130, the rate with which data is collected from the FCDs 20 may be adaptively controlled. For example, if an INIM 130 determines that the rate of change of data corresponding to a flow total has doubled, the INIM 130 may double its rate of data collection for the corresponding FCD 20. It will be appreciated that the rate of data collection may alternatively be adaptively controlled based upon an identical determination performed within the gateway server 102 and communicated to the INIMs 130 as a corresponding instruction.

It will be appreciated that incorporation of the INIMs 130 into the LFMNs 105 as described above distributes intelligent decision-making functionality throughout the DFMN 100 in a way that alleviates, to an extent, the scalability limitations associated with the NIMs 120.

Notwithstanding the advantages afforded by the NIMs 120 and the INIMs 130 as described above, the use of polling schemes for collecting flow data may be not be suitable in certain circumstances. For example, where POS locations of several different LFMNs 105 experience sudden and simultaneous spikes in beverage sales (e.g., during Superbowl Sunday), the gateway servers 102 may be unable to handle the increased volume of polling requests needed for retrieving the rapidly fluctuating flow data. Similarly, the use of polling schemes to collect data from a large number of LFMNs 105 may reduce polling frequencies to unacceptable levels. Furthermore, the use of polling schemes typically requires the assignment of a static IP address to the NIMs 120 and the INIMs 130 (in cases where the INIMs 130 do not implement DHCP functionality). In addition to the recurring cost associated with maintaining static IP addresses, each address must be known a priori and stored by the gateway server 102 software. If an existing static IP address is changed (e.g., due to a communication network 115 fault) or if a new LFMN 105 is added to the DFMN 100, the gateway server 102 software must be manually updated to reflect the new address information. Because such changes to static IP addresses may occur with considerable frequency within large DFMNs 100, administering the updates may become burdensome. Moreover, polling-based communication architectures typically have a low degree of fault tolerance and do not support remote troubleshooting of faults or other problems that may occur within the NIMs 120 and the INIMs 130.

As an alternative to the use of polling schemes for retrieving data from the LFMNs 105, embodiments of the DFMN 100 may integrate intelligent decision-making functionality for implementing an autonomous data distribution scheme. In particular, FCD 20 data may first be autonomously distributed by each LFMN 105 for receipt by one or more of the gateway servers 102. The gateway servers 102 may subsequently distribute the received data to one or more of the subscriber stations 110 based upon, for example, the content of the data. Importantly, because the autonomous data distribution functionality is spread across the LFMNs 105 and does not require external intervention or control, the problem of performance bottlenecks arising in large polling networks is avoided.

Figure 1D:
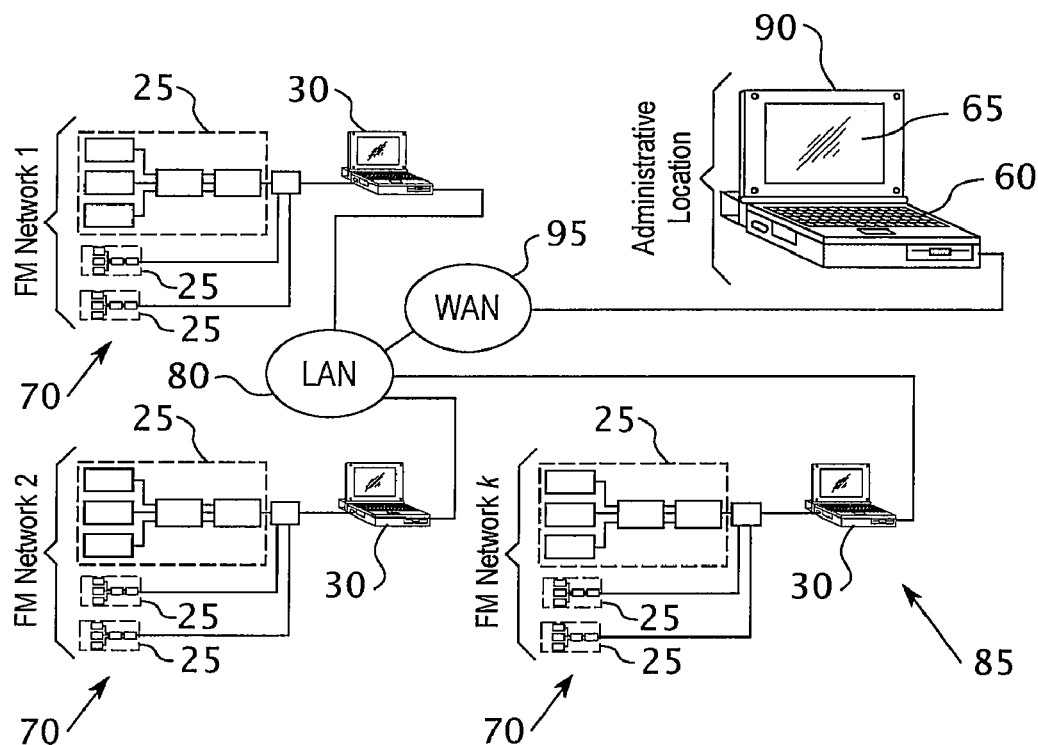
FIG. 1d is a schematic diagram of a conventional flow meter network.
Figure 6A:
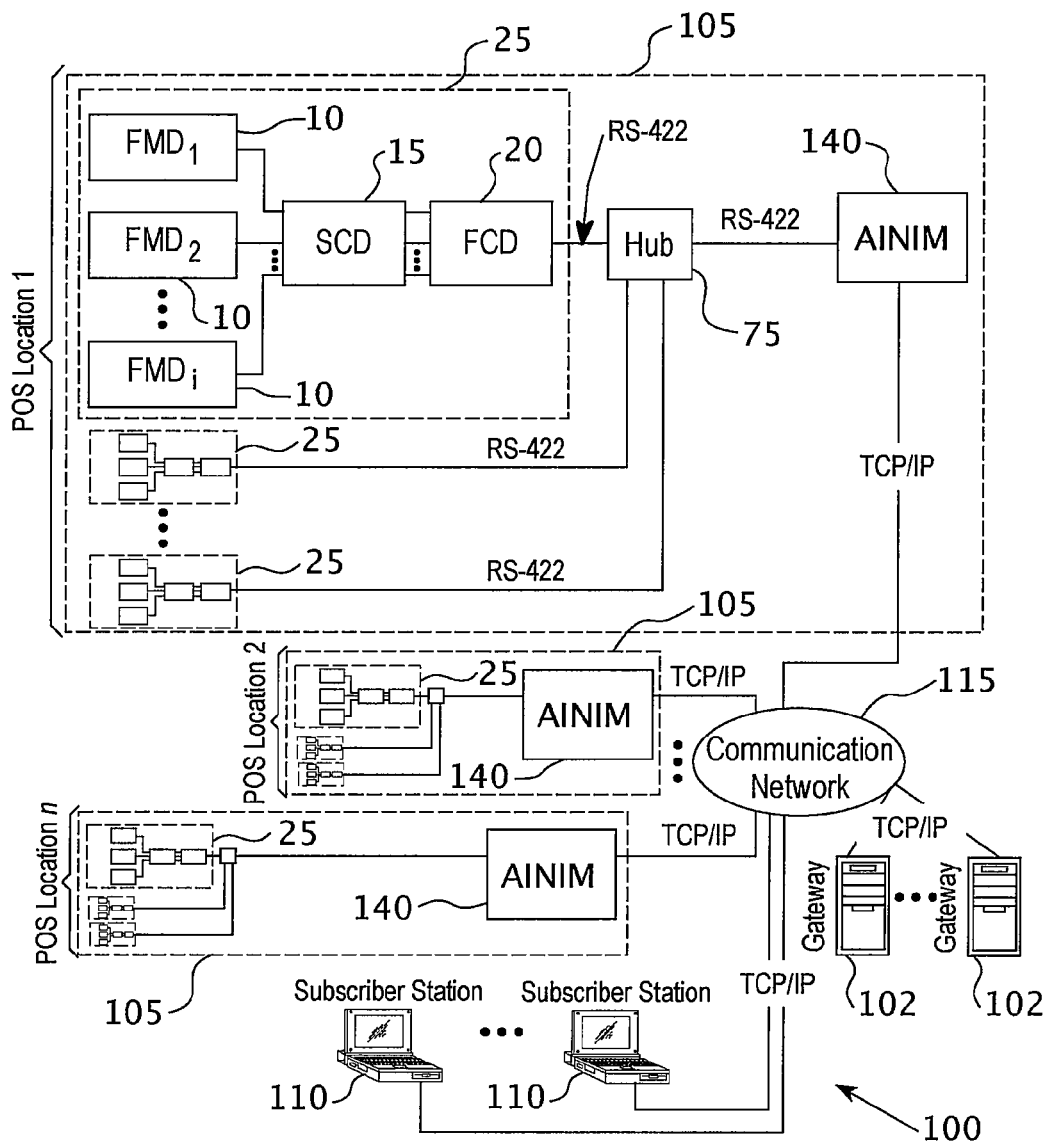
FIG. 6a illustrates a distributed flow meter network according to various embodiments of the present invention.
Figure 6B:
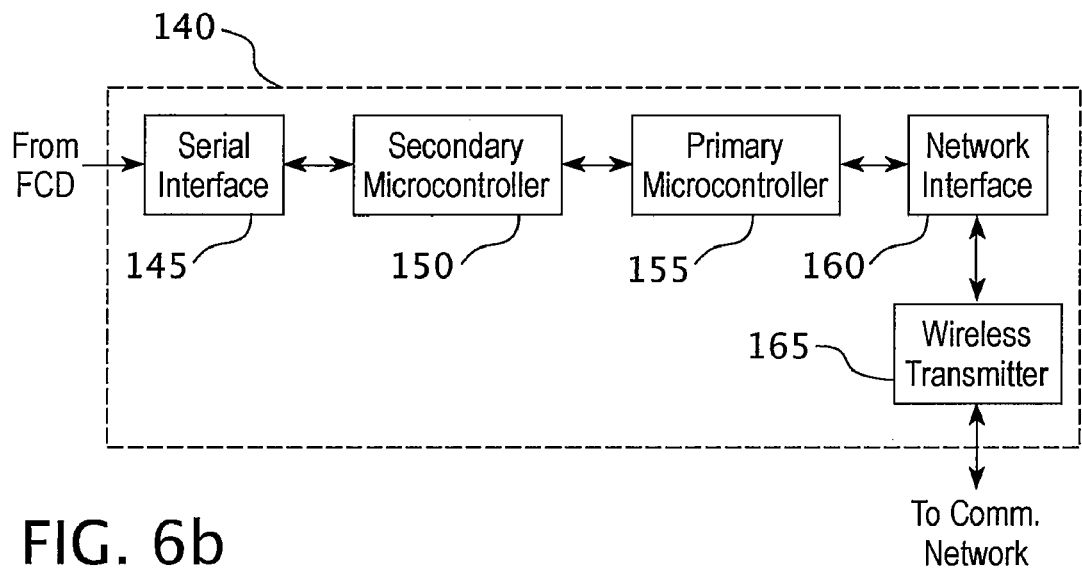
FIG. 6b is a schematic diagram of a autonomous intelligent interface module according to various embodiments of the present invention.

FIG. 6a illustrates a configuration of the DFMN 100 for implementing such an autonomous data distribution scheme according to various embodiments. The DFMN 100 is similar to the embodiments of FIG. 2a and FIG. 4, with the exception that each LFMN 105 comprises an autonomous intelligent network interface module (AINIM) 140 for communicatively interfacing the corresponding FCDs 20 with one or more of the gateway servers 102. With reference to FIG. 6b, each AINIM 140 may comprise a serial interface 145, a secondary microcontroller 150, a primary microcontroller 155, and a network interface 160. The AINIM 140 may further comprise a wireless transmitter 165. In addition to the advantages discussed below, the cost of each AINIM 140 is substantially less than that of the host computer 30 of FIG. 1d which it replaces. Furthermore, the specialized design of the AINIM 140 substantially reduces its cost relative to that of the NIM 120 or INIM 130 devices (e.g., the GW-23 Maxi serial server and the Netburner Mod5282 processor module discussed above).

Figure 6C:
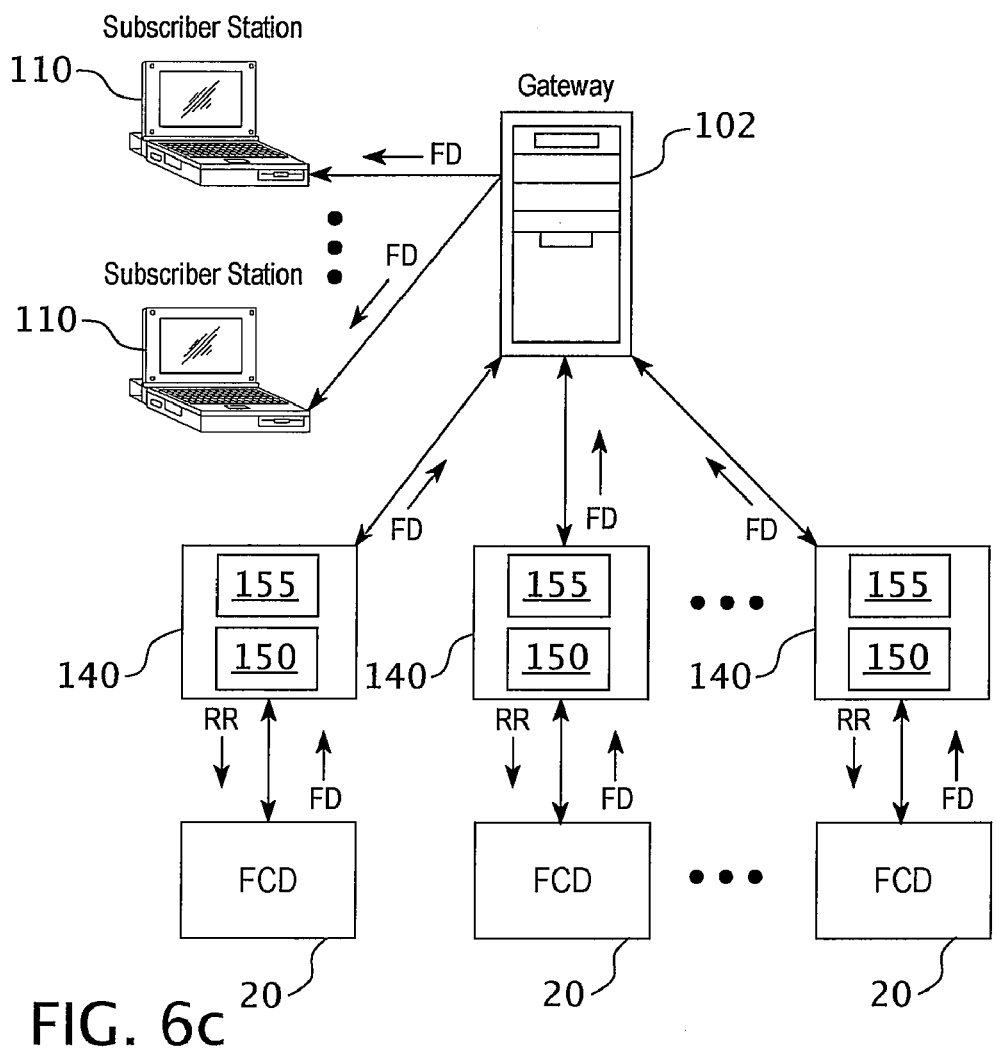
FIG. 6c is a schematic diagram of an autonomous data distribution scheme according to various embodiments of the present invention.

The serial interface 145 may be similar to that of the NIM 120 and INIM 130 described above and configured to provide a suitable communication interface between the FCDs 20 of the LFMN 105 and the secondary microcontroller 150. According to various embodiments, for example, the serial interface 145 may be implemented using an RS-232 level shifter. With reference to FIG. 6c, the secondary microcontroller 150 may contain firmware that, when executed, causes the secondary microcontroller 150 to autonomously transmit read requests to the corresponding FCDs 20 and receive data therefrom via the serial interface 145 in a continuous fashion. Thus, the secondary microcontroller 150 provides, in effect, a monitoring module for continuously monitoring and collecting data output by the FCDs 20. As data is received by the secondary microcontroller 150, it is simultaneously communicated to the primary microcontroller 155. According to various embodiments, the rate at which read requests are transmitted to a particular FCD 20 may be adaptively controlled by the secondary microcontroller 150 in a manner similar to that described above with respect the INIM 130. Thus, for example, if the secondary microcontroller 150 determines that the rate of change of data corresponding to a particular flow total has doubled, the secondary microcontroller 150 may double the rate with which read requests are transmitted to the corresponding FCD 20. According to other embodiments, the rate at which read requests are transmitted by the secondary microcontroller 150 may be externally controlled based upon, for example, an instruction received from the primary microcontroller 155 or a gateway server 102.

It will be appreciated from the discussion that follows that the AINIM 140 is highly configurable and may easily be adapted for use in metering systems other than those described herein. Additionally, because the AINIM 140 is accessible and configurable via the communication network 115, various tasks (e.g., configuring AINIM 140 policies, accessing FCD 20 calibration details, accessing modeling information, troubleshooting, etc.) may be performed remotely.

According to various embodiments and with further reference to FIG. 6c, the primary microcontroller 155 may implement firmware that, when executed, causes the primary microcontroller 155 to convert serial data as it is provided by the secondary microcontroller 150 into a format suitable for transmission via the communication network 115. The primary microcontroller 155 may be, for example, a 16-bit microcontroller, such as an AT91SAM microcontroller available from Atmel Corporation, San Jose, Calif., that is configured to support TCP/IP stack communication protocols. It will be appreciated that the primary microcontroller 155 may also implement a cryptographic protocol for ensuring the security of data transmitted via the communication network 115. Upon its conversion, the data may be communicated to the network interface 160 and then to the wireless transmitter 165 (if present), and subsequently distributed via the communication network 115 for receipt by one or more of the gateway servers 102. Thus, the primary microcontroller 155 may provide, in effect, a distribution module for autonomously distributing FCD 20 data via the communication network 115 as it is made available by the secondary microcontroller 150. It will be appreciated that the network interface 160 may be implemented using a commercially-available ISA network card or other suitable network interface device. Advantageously, because the mechanisms for distributing FCD 20 data are spread across the LFMNs 105 and are performed autonomously and in a continuous fashion, the scalability limitations inherent to polling-based embodiments are greatly reduced.

According to various embodiments, the primary microcontroller 155 and the network interface 160 may be configured such that communication between the AINIM 140 and one or more of the gateway servers 102 is established automatically upon connecting the AINIM 140 to the communication network 115. For example, the primary microcontroller 155 and the network interface 160 may be configured to automatically receive a dynamic IP address from a DHCP server (not shown) via the communication network 115 when connected thereto. The DHCP server may be operated, for example, by a network service provider or other party from who access to the communication network 115 is available for a fee. The primary microcontroller 155 may further be configured to store the IP addresses of one or more of the gateway servers 102 to which FCD 20 data is to be transmitted. The gateway server 102 IP addresses may be static IP addresses known a priori and stored by the primary microcontroller 155 firmware. Upon receiving a dynamic IP address from the DHCP server, the primary microcontroller 155 may register the dynamic IP address with the gateway servers 102 corresponding to the IP addresses stored by the firmware. The primary microcontroller 155 may also register other information with the gateway server 102 such as, for example, the number of FCDs 20 connected to the AINIM 140 and the number of inputs for each. In the event that the dynamic IP address is subsequently changed by the DHCP server, the primary microcontroller 155 may be configured to automatically reregister the new address. The ability of the AINIM 140 in some embodiments to automatically establish communication with one or more of the gateway servers 102 essentially enables its use as a "plug and play" communication device and eliminates the need for skilled installation personnel. Additionally, because the AINIMs 140 are able to communicate using dynamic IP addresses, the recurring cost and administrative burdens associated with maintaining static IP addresses are avoided.

In addition or as an alternative to the above-described AINIM 140 configuration in which data is continuously transmitted to one or more of the gateway servers 102 as it is read from the corresponding FCDs 20, one or more of the AINIMs 140 may be configured to transmit data to the gateway servers 102 in accordance with a policy. According to various embodiments, for example, the policy may be implemented as firmware instructions executed by the primary microcontroller 155 that define one or more predetermined conditions. When data is received from the secondary microcontroller 150 that satisfies one or more of the predetermined conditions, the primary microcontroller 155 may cause the data to be transmitted to one or more of the gateway servers 102. By way of example, a predetermined condition of the policy may specify a flow total threshold (e.g., 50 liters) for a particular dispensed beverage. Upon receiving data indicating that the flow total for the dispensed beverage has exceeded the specified threshold, the primary microcontroller 155 may transmit the data to the intended gateway servers 102. It will be appreciated that each predetermined condition of the policy may generally be any condition definable in terms of the FCD 20 data. For example, in addition to predetermined conditions relating to flow total thresholds, predetermined conditions may be based upon a rate of change of flow data (e.g., a ten liter flow total change in a five-minute time period) or based upon a fixed-increment change of flow data (e.g., every five-liter increase of a flow total). It will further be appreciated that in other embodiments of the present invention that are configured to monitor and analyze other meterable materials/products (e.g., water, natural gas, electricity, etc.) and/or physically measurable parameters (e.g., temperature, pressure, pH, toxicity, voltage, current, etc.), each predetermined condition of the policy may be defined in terms of the monitored quantities (e.g., kWh total threshold, rate of temperature change, etc.).

According to various embodiments, at least a portion of the policy implemented by each AINIM 140 for communicating data to the gateway servers 102 may be pre-configured within the AINIM 140 in the form of default conditions. For example, immediately subsequent to its installation, each AINIM 140 may transmit data for each dispensed beverage in accordance with a default 50 liter flow total threshold. Such default conditions may be subsequently modified as needed via the gateway server 102 (e.g., by modifying the threshold value or deleting the condition altogether). Similarly, the gateway server 102 may be used to add new conditions to the policy or replace conditions that were previously removed. In this way, the policy of each AINIM 140 may be configured remotely via the communication network 115.

According to various embodiments, the AINIMs 140 may be configured to autonomously adapt their respective policies in order to optimize and/or enhance the manner in which data is distributed to the gateway servers 102. Such adaptation may be either "offline" or "online," for example. Offline adaptation of a policy may be accomplished using a predetermined adaptation scheme. For example, a policy may initially specify a flow total threshold of 50 liters for a particular beverage. If the beverage is dispensed at a relatively slow rate (e.g., one liter per hour), distribution of flow data in accordance with the initial threshold may be too infrequent for purposes of tracking consumption of the beverage over the short term. Accordingly, the AINIM 140 may be configured to adapt (i.e., change) the initial threshold in a pre-determined manner (e.g., reduce the 50 liter threshold by fixed increments) such that flow data for the beverage is communicated more frequently. Offline adaptation may rely at least in part on consumption characteristics observed elsewhere (e.g., at other POS locations) and amortized to all AINIMs 140. Such consumption characteristics may have been observed in a different timeframe and may not be current. Particular advantages of offline adaptation include the ease with which it may be implemented and managed. Additionally, because offline adaptation results in fewer adaptations over time compared to online adaptation (discussed below), systems utilizing offline adaptation are generally more stable under high-traffic conditions.

Online adaptation of the policy may use, in various embodiments, machine learning techniques (e.g., neural networks, instance based learning, etc.) to "learn" consumption patterns for different dispensed beverages and adapt the predetermined conditions of the policy accordingly. For example, during periods of increased beverage consumption (e.g., during weekends), the AINIM 140 may automatically learn to increase the flow total thresholds associated with certain beverages so that data is communicated to the gateway servers 102 no more frequently than is necessary. Conversely, during periods of decreased beverage consumption (e.g., during weekdays), the AINIM 140 may automatically learn to decrease the flow total thresholds associated with certain beverages so that the corresponding flow totals are communicated to the gateway servers 102 more frequently. Online adaptations are more system and situation specific than offline adaptations, as they are determined based upon the current consumption characteristics for the corresponding POS location. Although more complex in implementation and management than offline adaptation, online adaptation is much more accurate and capable of real-time performance, as it relies on current data from the particular POS location where the adaptations occur. It is ideally suited for large franchises or similar entities comprising a large number of associated POS locations. Because the POS locations may be distributed over a large geographic area, each may be exposed to unique consumption and sales patterns, customer demographics, and consumer profiles. Large franchises may also include many different kinds of POS locations (e.g., sports bars, family restaurants, upscale restaurants, etc.) within them. Thus, online adaptation becomes necessary, as offline adaptation generally cannot be suitably customized for each particular POS location.

In addition or as an alternative to offline and online adaptation of a policy within each AINIM 140, policy adaptation may be effected remotely by one or more the gateway servers 102.

Although the transmission of FCD 20 data by the AINIMs 140 to the gateway servers 102 is preferably accomplished in an autonomous manner, it will be appreciated that the AINIMs 140 may additionally be configured to transmit FCD 20 data in response to polling requests received from the gateway servers 102 as described above in connection with embodiments utilizing the NIM 120 and the INIM 130.

The intelligent decision-making functionality of the AINIMs 140 may further be configured to provide fault-tolerant operation. According to various embodiments, for example, the primary microcontroller 155 may contain firmware that, when executed, causes the primary microcontroller 155 to buffer data when communication with one or more of the gateway servers 102 is lost due to a communication network 115 fault or other problem. If communication is subsequently reestablished, the buffered values may be automatically transmitted by the primary microcontroller 155 to the intended gateway servers 102. Data buffering by the primary microcontroller 155 may be performed in a manner identical to that described above with respect to the INIM 130, for example.

In addition to buffering data upon detecting a loss of communication with the gateway servers 102, the affected AINIM 140 may be configured to attempt communicating with one or more other AINIMs 140 to ascertain the nature of the network fault. The IP addresses of other AINIMs 140 may be obtained a priori from one or more of the gateway servers 102, for example, and stored by the primary microcontroller 155. If communication with other AINIMs 140 is established, the affected AINIM 140 may determine if the other AINIMs 140 are able to communicate with their respective gateway servers 102. If so, the affected AINIM 140 may forward FCD 20 data to the other AINIMs 140, along with IP addresses of the intended gateway server 102 recipients. In this way, the affected AINIM 140 may utilize the resources of other functioning AINIMs 140 to reroute the FCD 20 data.

According to other embodiments, fault tolerant communication between AINIMs 140 may be implemented using "group formation" methodologies known in the field of distributed systems. In such embodiments, each AINIM 140 may be configured to autonomously detect and establish communication with other AINIMs 140 without the need for previously-stored IP address information. In this way, the AINIMs 140 associated with POS locations within a common facility (e.g., a mall or resort) may form a group in which faults are detectable based on intermittent communication exchanges. For example, each AINIM 140 may occasionally ping the other AINIMs 140 within the group and determine their ability to communicate based upon their respective responses. If responses are received from all but one of the other AINIMs 140, the transmitting AINIM 140 may infer that the non-responsive AINIM 140 is experiencing a communication fault. Accordingly, the transmitting AINIM 140 may communicate a message to one or more of the gateway servers 102 identifying the non-responsive AINIM 140. The gateway servers 102 may, in turn, generate an alert message for notifying the appropriate parties of the fault condition. Each AINIM 140 may further communicate with other AINIMs 140 to diagnose its own communication faults. Thus, for example, where a particular AINIM 140 is unable to communicate with the gateway servers 102 and receives no responses from other AINIMs 140 in response to pings transmitted thereto, an internal communication fault may be inferred. If communication with other AINIMs 140 of the group is possible, the affected AINIM 140 may utilize their resources to reroute data.

In addition or as an alternative to relying upon other AINIMs 140 to reroute data to the gateway servers 102, an AINIM 140 that is unable to communicate with an intended gateway server 102 may attempt to communicate with one or more alternate gateway servers 102 using corresponding one or more alternate IP addresses that have been stored a priori within the AINIM 140.

Although the above-described implementations of the AINIM 140 utilize two microcontrollers 150, 155, it will be appreciated that a single microprocessor-based device may be used instead. For example, the AINIM 140 may alternatively be implemented using a single board computer (SBC) having integral serial and network interfaces and capable of supporting an operating system.

For embodiments utilizing polling schemes, the gateway server 102 software may cause the gateway servers 102 to transmit polling requests to one or more of the LFMNs 105 and to receive the corresponding FCD 20 data. As discussed above, the polling frequency may be constant, or alternatively, the gateway server 102 software may be configured to adaptably change the polling frequency for one or more of the polled devices based upon, for example, changes in FCD 20 data received therefrom.

Additionally, the gateway server 102 software may be configured to distribute FCD 20 data collected by each gateway server 102 to one or more of the subscriber stations 110 via the communication network 115. Distribution of the FCD 20 data may be performed in accordance with a content-based and/or condition-based distribution scheme, for example. Each subscriber station 110 may implement a software application (referred to hereinafter as "middleware") for communicating with the gateway server 102 software and for processing FCD 20 data provided thereby. As discussed above, each subscriber station 110 may be remotely located with respect to the POS and gateway server 102 locations and associated with a particular business enterprise (e.g., a restaurant chain, beverage distributor, a beverage manufacturer, etc.) having a need to monitor or analyze beverage dispensation at one or more of the POS locations. Although depicted as physically-networked personal computers (PCs), the subscriber stations 110 may generally be implemented using any processor-based computing device (e.g., servers, wireless PDAs and the like) that are capable of communicating with the gateway servers 102 and receiving data therefrom. It will be appreciated that the data needs of the business enterprises may differ. For example, a restaurant chain or beverage distributor may wish to obtain flow-related data from only POS locations respectively serviced by each, whereas a beverage manufacturer may wish to obtain flow-related data for only those products that it (or its competitor) sells, regardless of POS location. It will be appreciated that data needs may also be specified in terms of other criteria, such as, for example, geographic criteria (zip code, city, etc.).

To facilitate the distribution of FCD 20 data in accordance with the various data needs of the business enterprises, the gateway server 102 software may implement a content filter for filtering the FCD 20 data based upon its content. According to various embodiments, for example, the content filter may be configured to filter FCD 20 data in accordance with the preassigned identification data that identifies the particular FCD 20 and FCD 20 input associated with each data value, as described above. The filtered data values may then be routed to each subscriber station 110 in accordance with a corresponding content policy indicating the particular data need. According to various embodiments, for example, the content policy for a particular subscriber station 100 may specify the FCDs 20 and corresponding inputs for which data is to be provided. According to other embodiments, the content policy may specify more general criteria (e.g., product, brand, geographic location, etc.) that identify the particular data needed. For such embodiments, the gateway server 102 software may be configured to identify particular FCDs 20 and corresponding inputs that satisfy the criteria using, for example, a relational database. It will be appreciated that a content policy may additionally specify one or more predefined conditions under which FCD 20 data is to be provided to a subscriber station 110. For example, a content policy may specify that FCD 20 data for a particular beverage and POS location is to be communicated only when the corresponding flow total exceeds a predefined threshold. Upon determining the satisfaction of the predefined condition, the gateway server 102 may communicate the data accordingly. It will be appreciated that the predefined conditions may include any condition definable in terms of the FCD 20 data (e.g., volumetric conditions, rate of change conditions, etc.).

According to various embodiments, the distribution scheme implemented by the gateway server 102 software may be simplified by configuring each gateway server 102 to receive specific FCD 20 data. For example, in embodiments utilizing polling schemes, each gateway server 102 may be configured to selectively poll such that only FCD 20 data associated with a particular group of POS locations (e.g., POS locations corresponding to a particular restaurant chain) is received. Alternatively, each gateway server 102 may be configured to selectively poll such that FCD 20 data for only a particular beverage brand (e.g., Coors beer) is received. In this way, each gateway server 102 may be dedicated to a subset of subscriber stations 110 having common data needs.

As an alternative to routing the filtered data values to the subscriber stations 110, it will be appreciated that the filtered data values may instead be hosted on their respective gateway servers 102 (or another server, e.g., a web server) for access by the subscriber stations 110 in accordance with a client-server communication architecture. According to such embodiments, the hosted data may be accessed by the subscriber stations 110 by downloading a hosted file or by viewing the contents of a hosted file via a graphical user interface, such as, for example, a web browser interface.

According to various embodiments, each gateway server 102 may implement load-balancing to relieve overload conditions that may occur, for example, when a sudden spike of data is transmitted to the gateway server 102 from multiple LFMNs 105. Load-balancing may be enabled in accordance with a policy stored within the gateway server 102 and specify one or more conditions under which load-balancing is to be enabled. The policy may specify, for example, that the gateway server 102 is to enable load-balancing when the number of LFMN 105 data transmissions serviced by the gateway server 102 exceeds a predetermined threshold. Upon the occurrence of this condition, the gateway server 102 may spawn additional gateway servers (not shown) as needed for servicing the data transmissions. The spawned gateway servers may be duplicates of the primary gateway server 102 (i.e., the gateway server 102 implementing the policy), with the exception that they cannot perform load-balancing themselves. Once load-balancing is enabled in this fashion, the primary gateway server 102 operates only as a load-balance server such that the spawned gateway servers service all of the off-loaded LFMN 102 data transmissions. Additionally or alternatively, a router (not shown) may be provided to balance gateway server 102 loads.

In the event that one or more of the gateway servers 102 becomes nonoperational, redundant backup gateway servers may be provided. Each backup gateway server may continuously ping one or more gateway servers 102 in active service for the purpose of determining their operational status. In the event that a reply is not received, indicating a possible fault, one of the backup gateway servers may automatically assume the role of the non-responsive gateway server 102. When a non-responsive gateway server 102 is detected by more than one gateway backup server, a bidding/voting mechanism may be employed for selecting which backup gateway server shall take over as the gateway server 102.

According to various embodiments, inventory control may be implemented within a gateway server 102 in accordance with predefined policies stored thereon. In other embodiments, inventory control may be implemented within a subscriber station 110. Each policy may be associated, for example, with a business enterprise operating one or more of the POS locations and specify criteria under which beverages are to be supplied thereto and in what quantities. Such conditions may include, without limitation, location criteria (e.g., POS location, POS region, POS state, etc.), sales criteria (e.g., type/brand of beverages sold, the amount of beverages sold, the rate at which beverages are sold, etc.), and time criteria (e.g, durational, day of the week, season, etc.), as well as combinations of such conditions. For example, a policy for a particular business enterprise may specify that when combined sales of a particular beverage $B_1$ at POS locations POS1, POS2, and POS3 reach a threshold X (e.g., 100 liters) over a time duration Y (e.g., one week) during a seasonal time frame Z (e.g., the summer), amounts $A_1$ and $A_2$ of beverage $B_1$ are to be re-ordered for POS locations POS1 and POS2, respectively, and the re-order amount $A_3$ for POS location $POS_3$ is to be increased by 10%. When the conditions of a policy are satisfied, an inventory control message may be transmitted to the appropriate party (e.g., a distributor and/or POS owner) via the communication network 115. Additionally or alternatively, the gateway server 102 may be configured to perform the steps necessary for replenishing inventories in accordance with the policy. Such steps may include, for example, automatically generating a beverage delivery order. This is just one example of inventory control. Other types of inventory control may also be employed.

Additionally, embodiments of the present invention may be configured to generate one or more consumption pattern models and/or consumer models for use in a variety of different applications. Consumption pattern models may be employed to identify useful relationships between beverage sales and a one or more variables. Such models may be generated, for example, through the application of known regression-based techniques in order to correlate beverage sales with the one or more variables. Suitable variables may include, without limitation, location variables (e.g., POS location, POS region, POS state, etc.), time variables (e.g, durational, day of the week, season, etc.), variables relating to the consumption rates of other beverages, and combinations thereof. Other variables, such as, for example, the occurrence of certain events (e.g., sporting events, promotional events, etc.), may also be reflected in the consumption pattern model. As an example, a consumer pattern model may be used to determine, for example, that for POS locations within region $R_1$, sales of a particular beverage $B_1$ increase 5% during the summer months and decrease 10% during the winter months. It will be appreciated that consumer pattern model are particularly useful to business enterprises that deal with the sale of beverage products (e.g., POS operators and beverage distributors and manufacturers) and may be used, for example, to develop pricing strategies. It will be further appreciated that such models may incorporated into other applications, such as, for example, inventory control applications as discussed above. For example, if a consumption pattern model indicates that sales of a beverage $B_2$ are typically half of the sales of a beverage $B_1$ over the same time period, a re-order policy specifying a re-order amount $A_1$ for $B_1$ may automatically specify a re-order amount of $0.5 \times A_1$ for beverage $B_2$.

Consumer models may be more general than the consumption pattern models and may be used to express the dependence of any number of general factors useful to third parties upon one or more different variables. The factors may be specified a priori by the third parties (e.g., business enterprises not directly associated with a POS location) and may be useful for, among other things, developing and implementing sale and advertising activities. Examples of such factors may include, without limitation, POS occupancy, POS customer demographics, and POS promotional activity. Variables upon which these factors may depend may be similar to those for the consumer pattern model and include, for example, location variables (e.g., POS location, POS region, POS state, etc.), time variables (e.g, durational, day of the week, season, etc.), as well as variables relating to the occurrence of certain events (e.g., sporting events, promotional events, etc.). Values for certain factors may be inferred based upon sales data (e.g., high occupancy may be inferred from high sales), whereas the values of other of the factors (e.g., customer demographic, promotional activity) may be based upon causal observation.

According to various embodiments, the above-described models may be generated at a local level. For example, the LFMNs 105 corresponding to the POS locations of a common facility (e.g., a mall or resort) may be in communication with a local server (not shown) that is configured to collect data from each LFMN 105 and to generate the local models therefrom. Also, local-level models may be generated using the subscriber stations 110. As discussed above, each AINIM 140 may implement an adaptive policy for optimizing the manner in which data is communicated. Each AINIM 140 may also be configured to autonomously detect and establish communication with other AINIMs 140 in order to form a group capable of implementing some degree of fault tolerance. For each group of AINIMs 140 corresponding to a common facility, model generation may be initiated by the local server at a predetermined time or in response to a request received from a gateway server 102. Once initiated, the local server may communicate with each of the AINIMs 140 and receive data necessary for generating the local models.

According to various embodiments, data received by the local server from the corresponding group of AINIMs 140 may be weighted differently depending upon, among other things, the degree of interest in the readings from a business-related standpoint. For example, consider the sale of a particular beverage at two commonly-managed POS locations within a mall. The first POS location may be a low-cost outlet or otherwise engage in promotional activity to increase sales of the beverage, whereas the second POS location may be an upscale restaurant that sells the beverage at a higher price and without a discount. The mall operator managing the POS locations may choose to weight increased sales at the first POS location less than increased sales at the second POS location because of the promotional activity at the first POS location. Alternatively, the mall operator may place more weight on increased sales at the first POS location. Accordingly, the data used to construct the models may be weighted based upon business-related interests of their intended users. It will be appreciated that the weightings may additionally be dependent upon other factors (e.g., the time of day, the season, etc.).

According to various embodiments, a confidence value may be computed for each locally-generated model. The confidence value may take into account different factors, such as, for example, the amount of downtime of the particular AINIM 140 group from which the data originated. For example, if a particular AINIM 140 group is non-operational for a period of time, the confidence value may function to reduce the weight of the corresponding data over time (although the data is not deleted from the model). When operation of the AINIM 140 group resumes, its weight may be restored, but groups that have been in continuous operation may have higher data weights. According to other embodiments, the confidence value may function to modify weights over time. As an example, consider five AINIM 140 groups at time $t_1$, each group having a weight of 20%. At time $t_2$, the third group may become non-operational such that the weight associated with each of the remaining groups is increased to 25%. At time $t_3$, the third group may resume normal operation such that the weight of each group is returned to 20%. The overall weight for each group may be determined as a ratio of its total "earned weight" to the group-wide up-time. Thus, for the above example, the third group would receive an overall weight of (20+0+20)/3=16.33, whereas the continuously operational groups would receive overall weights of (20+25+20)/3=21.66.

Upon computing a confidence value for each locally-generated model, each model may be forwarded from its respective local server (or subscriber station 110) to the corresponding gateway servers 102 in the form of a message. At the gateway servers 102, the confidence value from each AINIM 140 group may be combined with an external confidence value that has been pre-configured for each AINIM 140 group. Each local model may then be processed to derive global consumption pattern and/or consumer models as needed. It will be appreciated that the global models may be generated by the gateway servers 102 or using other computational resources in communication with the communication network 115. The global models may be stored using, for example, multi-dimensional databases or other suitable storage schemes.

Use of the generated global models may vary depending upon the needs of their particular users. According to various embodiments, for example, users of the subscriber stations 110 may submit policies to the gateway servers 102 indicating one or more conditions under which an alert or other notification is to be automatically issued to the user via the subscriber station 110 or other device. For example, a user that is a beverage distributor or manufacturer may submit a policy such that alerts are issued based upon current consumption trends (e.g., the highest selling beverage in a particular region during a particular week of the summer, etc.). Similarly, a third party user, such as, for example, a restaurant supplier may submit a policy such that alerts are issued based upon the occupancy levels at up-scale eateries and the like.

In addition or as an alternative to issuing alerts responsive to predefined policies, embodiments of the present invention may support complex and intelligent querying capabilities. According to such embodiments, a user of a subscriber station 110 or other device in communication with the communication network 115 may submit an intelligent query for identifying relationships and patterns existing in the data embodied in the global models. For example, a beverage manufacturer may submit a query requesting a comparison of the sales of a particular beverage for two different regions during the previous five weeks. Other queries may be submitted, for example, to determine an optimal marketing strategy. Such a query may be, for example: What is the most opportune time for a beverage distributor A to offer a promotion to a potential customer B (e.g., a POS location) and what type of promotion should be offered, given that the distributor A currently supplies POS locations C, D, and E in a region F that is adjacent to region G of the potential customer B?

According to various embodiments, one or more of the middleware applications or gateway servers 102 may implement a policy for generating an advertisement message to be displayed at one or more POS locations or other locations. The policy may employ one or more of the above-described consumption pattern models and consumer models for determining the optimal timing, content, and placement of the advertisement message. For example, a consumption pattern model may be used to determine that for POS locations $POS_1$ and $POS_2$, sales of a beverage $B_1$ tend to decrease during latter months of the summer season. Accordingly, the policy may specify that during this time, advertisement messages offering beverage $B_1$ at a discounted price are to be generated for display at POS locations $POS_1$ and $POS_2$. A consumer model may similarly be used by a third party (e.g., a clothing retailer in a mall having one or more POS locations), for example, to determine that during weeknights, one of the POS locations frequented by customers of a particular demographic is characterized by high occupancy levels. Accordingly, a policy associated with the third party may specify that during these times, advertisements are to be generated that target the particular customer demographic. According to various embodiments, the generated advertisement messages may be transmitted to another party (e.g., a closed-circuit television service) that creates advertisements for display at various POS locations and/or other locations.

Figure 7A:
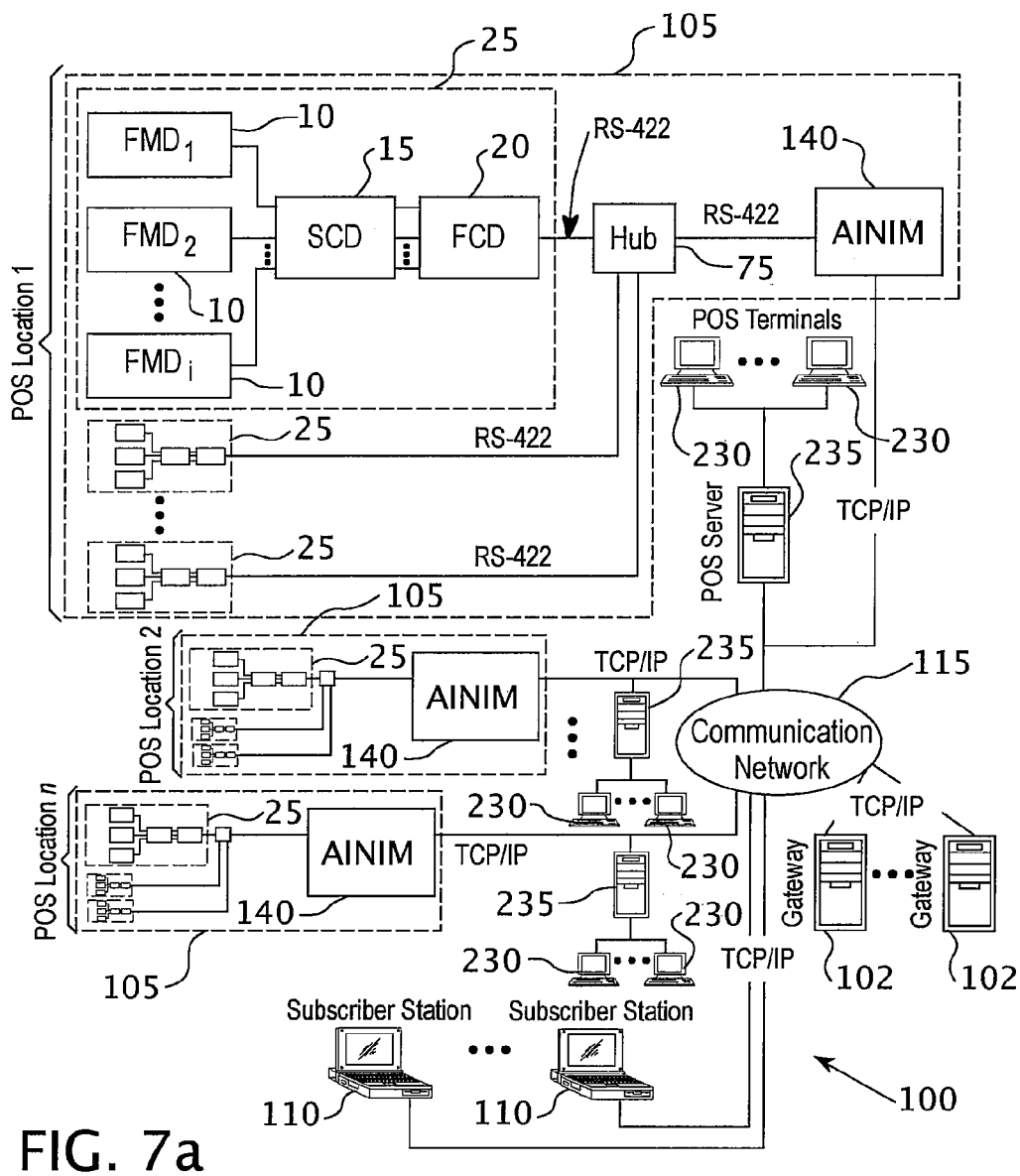
FIG. 7a illustrates a distributed flow meter network according to various embodiments of the present invention.

FIG. 7a illustrates a configuration of the DFMN 100 for implementing real time product and sales reconciliation according to various embodiments. The DFMN 100 may be similar to that of FIG. 6a and further include one or more POS terminals 230 at each POS location. Each POS terminal 230 may generally be any processor-based POS terminal configured with POS software for registering a beverage sale, generating and storing data pertaining to the sale, and communicating the sales data via a computer network. Sales data may include, for example, product information (e.g., beverage type, beverage brand), the amount sold (e.g., units sold, ounces sold), a timestamp indicating the date and time of the sale, and the POS location. The DFMN 100 may further include a POS server 235 in communication with the POS terminals 230 at each POS location configured for receiving sales data generated by each corresponding POS terminal 230 and communicating the received data a message-based format to one or more of the gateway servers 102 via the communication network 115. Receipt of the sales data by each POS server 235 and its subsequent communication to the gateway servers 102 is performed in real time, e.g., substantially simultaneously with the generation of the data by the corresponding POS terminals 230. For a particular POS location, the gateway servers 102 to which the sales data is communicated may correspond to the gateway servers 102 to which the FCD 20 data is communicated by the corresponding AINIM 140. For example, in embodiments in which one or more of the POS locations are associated with a common business enterprise (e.g., a restaurant chain), the FCD 20 data and the sales data from the POS locations may be communicated to a common gateway server 102 associated with the business enterprise. It will be appreciated that although the DFMN 100 of FIG. 7a includes an AINIM 140 at each POS location, the DFMN 100 may alternatively include a NIM 120 or an INIM 130 at each POS location as discussed above in connection with FIG. 2a and FIG. 4, respectively.

According to various embodiments, one or more gateway servers 102 may implement software for generating a reconciliation report(s) based on the FCD data 20 and the corresponding sales data received from a POS location. FIG. 7b illustrates an example of a real time reconciliation report 240 generated by a gateway server 102 for a single POS location. Although the report 240 is shown in a tabular format, it will be appreciated that other suitable reporting formats may alternatively be used. For each beverage dispensed at the POS location, the report 240 may include the current flow total as indicated by the FCD 20 data (e.g., ounces poured) and the corresponding current sales total (e.g., ounces sold) as indicated by the totalized sales data. The report 240 may further include the difference between the current flow total and the corresponding current sales total expressed in terms of volume and percent variance for each dispensed beverage. The current flow totals, the current sales totals, and the differences therebetween (in ounces and percent variance) may be respectively totalized for all of the beverages and included within the report 240. Additionally, the report 240 may include the current time and date, as well as the time and date of the most recent data communication (e.g., FCD 20 data or sales data) from the POS location. Because the report 240 may be updated in real time, any discrepancies arising from problems such as over/under pouring, beverage theft (e.g., dispensing a beverage without recording a sale), improper use of the POS terminals 230, and inventory mismanagement may be immediately identified and addressed. For example, in response to a customer order of a sixteen-ounce beverage B at the POS location, a server may dispense the beverage but carelessly spill 2.5 ounces. The FCD 20 data transmitted to the gateway server 102 thus indicates that 18.5 ounces of beverage B has been dispensed. Subsequent to serving the beverage, the server may register a sixteen-ounce sale of beverage B via the POS terminal 230. The corresponding sales data is communicated in real time to the gateway server 102. Accordingly, the real time reconciliation report 240 generated by the gateway server 102 will display a variance-ounce value of −2.5 for beverage B (e.g. sixteen ounces sold less the 18.5 ounces dispensed), indicating that 2.5 ounces of beverage B has been wasted.

According to various embodiments, real time reconciliation reports 240 may be hosted by the gateway servers 102 and made accessible to one or more of the subscriber stations 110 via a web page interface, for example. Additionally, the gateway servers 102 may also be configured for generating historical reconciliation reports (not shown) covering past time periods (e.g., days, week, months, etc.) for the POS location for access by one or more of the subscriber stations 110 in a similar fashion.

Whereas particular embodiments of the invention have been described herein for the purpose of illustrating the invention and not for the purpose of limiting the same, it will be appreciated by those of ordinary skill in the art that numerous variations of the details, materials, configurations and arrangement of components may be made within the principle and scope of the invention without departing from the spirit of the invention. The preceding description, therefore, is not meant to limit the scope of the invention.

The invention claimed is:

1. A system for monitoring one or more nodes of a distributed meter network, comprising:
   at least one flow meter device at each node for metering a liquid and for generating a signal representative of a corresponding metering rate of the liquid;
   a computation device at each node in communication with the at least one flow meter device for computing meter data based upon the generated signal, wherein the meter data comprises data selected from the group consisting of: a flow rate of the liquid and a flow total of the liquid; and
   an autonomous intelligent network interface module (AINIM) at each node and in communication with the computation device, wherein the AINIM comprises at least one microcontroller having firmware stored thereon that, when executed, causes the at least one microcontroller to:
   autonomously and continuously collect meter data from the computation device;
   during a first time period when the at least one microcontroller is unable to communicate with a remote computer via a communication network, buffer meter data collected from the computation device during the first time period; and
   during a second time period when the at least one microcontroller is able to communicate with the remote computer via the communication network, distribute to the remote computer via the communication network at least a portion of the meter data collected from the computation device during the second time period and at least a portion of the buffered meter data.

2. The system of claim 1, wherein at least one node of the distributed meter network is a point-of-sale (POS) location.

3. The system of claim 1, wherein the firmware of the at least one microcontroller, when executed, further causes the at least one microcontroller to autonomously adapt a rate with which the meter data is collected from the computation device based upon a characteristic of the meter data.

4. The system of claim 1, wherein the firmware of the at least one microcontroller, when executed, further causes the at least one microcontroller to continuously distribute meter data collected from the computation device during the second time period to the remote computer via the communication network concomitant with collection of the meter data by the at least one, microcontroller.

5. The system of claim 1, wherein the firmware of the at least one microcontroller, when executed, further causes the at least one microcontroller to distribute collected meter data to the remote computer via the communication network in accordance with a policy, wherein the policy comprises one more predetermined conditions.

6. The system of claim 1, wherein the firmware of the at least one microcontroller, when executed, further causes the at least one microcontroller to apply a communication protocol to meter data.

7. The system of claim 1, wherein the firmware of the at least one microcontroller, when executed, further causes the at least one microcontroller to:

receive a dynamic IP address from a dynamic host protocol (DHCP) server responsive to connection of the AINIM to the communication network;

initiate communication between the AINIM and the remote computer via the communication network based upon a static IP address associated with the remote computer and stored within the firmware of the at least one microcontroller; and register the dynamic IP address with the remote computer.

8. The system of claim 1, wherein the firmware of the at least one microcontroller, when executed, further causes the at least one microcontroller to perform the following responsive to an indication of a fault of the communication network:

establish communication with another AINIM;

determine one of an ability or inability of the another AINIM to communicate with the communication network; and reroute the buffered data to the remote computer via the another AINIM if an ability is determined.

9. The system of claim 1, wherein the communication network comprises the Internet.

10. The system of claim 1, wherein the at least one microcontroller comprises a first microcontroller in communication with a second microcontroller, wherein autonomous and continuous collection of meter data from the computation device is performed by the first microcontroller, and wherein buffering of meter data collected during the first time period and distribution to the remote computer of meter data received from the computation device during the second time period and buffered meter data is performed by the second microcontroller.

* * * * *

UNITED STATES PATENT AND TRADEMARK OFFICE
CERTIFICATE OF CORRECTION

PATENT NO. : 7,606,732 B2
APPLICATION NO. : 11/377915
DATED : October 20, 2009
INVENTOR(S) : Raghunathan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this

Fourteenth Day of December, 2010

David J. Kappos
*Director of the United States Patent and Trademark Office*